(12) United States Patent
McGrew et al.

(10) Patent No.: US 10,719,621 B2
(45) Date of Patent: *Jul. 21, 2020

(54) PROVIDING UNIQUE VIEWS OF DATA BASED ON CHANGES OR RULES

(71) Applicant: Palantir Technologies Inc., Palo Alto, CA (US)

(72) Inventors: Robert J. McGrew, Palo Alto, CA (US); Nathan Gettings, Fremont, CA (US); Stephen Baburao Cohen, Fremont, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/285,900

(22) Filed: Feb. 26, 2019

(65) Prior Publication Data

US 2019/0188407 A1  Jun. 20, 2019

Related U.S. Application Data

(63) Continuation of application No. 15/690,099, filed on Aug. 29, 2017, now Pat. No. 10,229,284, which is a
(Continued)

(51) Int. Cl.
*G06F 21/62* (2013.01)
*G06F 16/21* (2019.01)
(Continued)

(52) U.S. Cl.
CPC ...... *G06F 21/6218* (2013.01); *G06F 16/1873* (2019.01); *G06F 16/219* (2019.01);
(Continued)

(58) Field of Classification Search
CPC .............. G06F 21/6218; G06F 16/219; G06F 16/2329; G06F 16/2445; G06F 16/1873; G06Q 50/18; G06Q 50/26
See application file for complete search history.

(56) References Cited

U.S. PATENT DOCUMENTS 4,881,179 A   11/1989   Vincent
5,109,399 A    4/1992   Thompson
(Continued)

FOREIGN PATENT DOCUMENTS

AU   2013251186   11/2015
AU   2014206155   12/2015
(Continued)

OTHER PUBLICATIONS

U.S. Appl. No. 14/134,558, filed Dec. 19, 2013, Office Action, dated Oct. 7, 2015.
(Continued)

*Primary Examiner* — Darren B Schwartz
(74) *Attorney, Agent, or Firm* — Hickman Palermo Becker Bingham LLP

(57) ABSTRACT

In one embodiment, a method comprises creating and storing, one or more data objects; wherein a first plurality of the data objects is associated with a base set of data representing data shared across a plurality of users; wherein a second plurality of the data objects is associated with one or more child sets of data, wherein each of the child sets of data represents data local to a project, wherein each of the users is associated with one or more of the child sets of data; wherein each data object is associated to an identifier value and to a version identifier value for a plurality of versions of the data object, wherein each of the versions represents a change to the data object by any of a plurality of users; receiving a request from a first user to view a third plurality of data objects; selecting, based on the base set of data, the particular set of data, the version identifier value for the data objects in the third plurality, and one or more rules associated with the particular set of data and the first user, data objects in the third plurality that can be viewed by the first user; creating a particular data view that includes only the
(Continued)

selected data objects; and providing a display of the particular data view to the first user.

20 Claims, 9 Drawing Sheets

Related U.S. Application Data continuation of application No. 15/438,453, filed on Feb. 21, 2017, now Pat. No. 9,760,733, which is a continuation of application No. 14/578,389, filed on Dec. 20, 2014, now Pat. No. 9,576,003, which is a continuation of application No. 11/709,462, filed on Feb. 21, 2007, now Pat. No. 8,930,331.

(51) Int. Cl.
*G06F 16/23* (2019.01)
*G06F 16/242* (2019.01)
*G06F 16/18* (2019.01)
*G06Q 50/18* (2012.01)
*G06Q 50/26* (2012.01)

(52) U.S. Cl.
CPC ...... *G06F 16/2329* (2019.01); *G06F 16/2445* (2019.01); *G06Q 50/18* (2013.01); *G06Q 50/26* (2013.01)

(56) References Cited

U.S. PATENT DOCUMENTS

| | | |
|---|---|---|
| 5,241,625 A | 8/1993 | Epard et al. |
| 5,329,108 A | 7/1994 | Lamoure |
| 5,623,659 A | 4/1997 | Shi et al. |
| 5,632,009 A | 5/1997 | Rao et al. |
| 5,670,987 A | 9/1997 | Doi et al. |
| 5,724,575 A | 3/1998 | Hoover et al. |
| 5,781,704 A | 7/1998 | Rossmo |
| 5,798,769 A | 8/1998 | Chiu et al. |
| 5,835,601 A * | 11/1998 | Shimbo ............... G06Q 10/10 713/165 |
| 5,845,300 A | 12/1998 | Corner |
| 5,872,973 A | 2/1999 | Mitchell et al. |
| 5,897,636 A | 4/1999 | Kaeser |
| 5,999,911 A | 12/1999 | Berg et al. |
| 6,057,757 A | 5/2000 | Arrowsmith et al. |
| 6,065,026 A | 5/2000 | Cornelia et al. |
| 6,073,129 A | 6/2000 | Levine et al. |
| 6,091,956 A | 7/2000 | Hollenberg |
| 6,094,653 A | 7/2000 | Li et al. |
| 6,101,479 A | 8/2000 | Shaw |
| 6,161,098 A | 12/2000 | Wallman |
| 6,219,053 B1 | 4/2001 | Tachibana et al. |
| 6,232,971 B1 | 5/2001 | Haynes |
| 6,237,138 B1 | 5/2001 | Hameluck et al. |
| 6,243,706 B1 | 6/2001 | Moreau et al. |
| 6,243,717 B1 | 6/2001 | Gordon et al. |
| 6,247,019 B1 | 6/2001 | Davies |
| 6,279,018 B1 | 8/2001 | Kudrolli et al. |
| 6,304,873 B1 | 10/2001 | Klein et al. |
| 6,341,310 B1 | 1/2002 | Leshem et al. |
| 6,366,933 B1 | 4/2002 | Ball et al. |
| 6,369,835 B1 | 4/2002 | Lin |
| 6,370,538 B1 | 4/2002 | Lamping et al. |
| 6,418,438 B1 | 7/2002 | Campbell |
| 6,430,305 B1 | 8/2002 | Decker |
| 6,456,997 B1 | 9/2002 | Shukla |
| 6,510,504 B2 | 1/2003 | Satyanarayana |
| 6,523,019 B1 | 2/2003 | Borthwick |
| 6,549,752 B2 | 4/2003 | Tsukamoto |
| 6,549,944 B1 | 4/2003 | Weinberg et al. |
| 6,560,620 B1 | 5/2003 | Ching |
| 6,574,635 B2 | 6/2003 | Stauber et al. |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,665,683 B1 | 12/2003 | Meltzer |
| 6,674,434 B1 | 1/2004 | Chojnacki et al. |
| 6,714,936 B1 | 3/2004 | Nevin, III |
| 6,745,382 B1 | 6/2004 | Zothner |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,850,317 B2 | 2/2005 | Mullins et al. |
| 6,877,137 B1 | 4/2005 | Rivette et al. |
| 6,944,777 B1 | 9/2005 | Belani et al. |
| 6,944,821 B1 | 9/2005 | Bates et al. |
| 6,967,589 B1 | 11/2005 | Peters |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,058,648 B1 | 6/2006 | Lightfoot et al. |
| 7,086,028 B1 | 8/2006 | Davis et al. |
| 7,111,231 B1 | 9/2006 | Huck et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,174,377 B2 | 2/2007 | Bernard et al. |
| 7,194,680 B1 | 3/2007 | Roy et al. |
| 7,213,030 B1 | 5/2007 | Jenkins |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,392,254 B1 | 6/2008 | Jenkins |
| 7,426,654 B2 | 9/2008 | Adams et al. |
| 7,440,978 B2 | 10/2008 | Chan et al. |
| 7,441,182 B2 | 10/2008 | Beilinson et al. |
| 7,441,219 B2 | 10/2008 | Perry et al. |
| 7,454,466 B2 | 11/2008 | Bellotti et al. |
| 7,461,158 B2 | 12/2008 | Rider et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,455 B1 | 12/2009 | Keene et al. |
| 7,634,717 B2 | 12/2009 | Chamberlain et al. |
| 7,685,109 B1 | 3/2010 | Ransil et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,716,140 B1 | 5/2010 | Nielsen et al. |
| 7,725,530 B2 | 5/2010 | Sah et al. |
| 7,725,547 B2 | 5/2010 | Albertson et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,761,407 B1 | 7/2010 | Stern |
| 7,765,489 B1 | 7/2010 | Shah |
| 7,770,100 B2 | 8/2010 | Chamberlain et al. |

(56) References Cited

U.S. PATENT DOCUMENTS

| | | |
|---|---|---|
| 7,805,457 B1 | 9/2010 | Viola et al. |
| 7,809,703 B2 | 10/2010 | Balabhadrapatruni et al. |
| 7,814,084 B2 | 10/2010 | Hallett et al. |
| 7,814,085 B1 | 10/2010 | Pfleger et al. |
| 7,818,658 B2 | 10/2010 | Chen |
| 7,870,493 B2 | 1/2011 | Pall et al. |
| 7,877,421 B2 | 1/2011 | Berger et al. |
| 7,880,921 B2 | 2/2011 | Dattilo et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,336 B1 | 5/2011 | Robin-Jan |
| 7,958,147 B1 | 6/2011 | Turner et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,966,199 B1 | 6/2011 | Frasher |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,041,714 B2 | 10/2011 | Aymeloglu et al. |
| 8,073,857 B2 | 12/2011 | Sreekanth |
| 8,103,543 B1 | 1/2012 | Zwicky |
| 8,112,425 B2 | 2/2012 | Baum et al. |
| 8,126,848 B2 | 2/2012 | Wagner |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,191,005 B2 | 5/2012 | Baier et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B2 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,392,556 B2 | 3/2013 | Goulet et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,504,542 B2 | 8/2013 | Chang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,527,949 B1 | 9/2013 | Pleis et al. |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,682,696 B1 | 3/2014 | Shanmugam |
| 8,688,573 B1 | 4/2014 | Ruknoic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,732,574 B2 | 5/2014 | Burr et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,799,313 B2 | 8/2014 | Satlow |
| 8,799,799 B1 | 8/2014 | Cervelli et al. |
| 8,807,948 B2 | 8/2014 | Luo et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,930,331 B2 | 1/2015 | McGrew et al. |
| 8,930,874 B2 | 1/2015 | Duff et al. |
| 8,937,619 B2 | 1/2015 | Sharma et al. |
| 8,938,686 B1 | 1/2015 | Erenrich et al. |
| 8,954,410 B2 | 2/2015 | Chang et al. |
| 8,984,390 B2 | 3/2015 | Aymeloglu et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,058,315 B2 | 6/2015 | Burr et al. |
| 9,092,482 B2 | 7/2015 | Harris et al. |
| 9,116,975 B2 | 8/2015 | Shankar et al. |
| 9,165,100 B2 | 10/2015 | Begur et al. |
| 9,208,159 B2 | 12/2015 | Stowe et al. |
| 9,230,280 B1 | 1/2016 | Maag et al. |
| 9,280,532 B2 | 3/2016 | Cicerone |
| 9,286,373 B2 | 3/2016 | Elliot et al. |
| 9,348,880 B1 | 5/2016 | Kramer et al. |
| 9,383,911 B2 | 7/2016 | Aymeloglu et al. |
| 9,542,446 B1 | 1/2017 | Duffield et al. |
| 9,576,003 B2 | 2/2017 | McGrew et al. |
| 9,639,578 B2 | 5/2017 | Stowe et al. |
| 2001/0021936 A1 | 9/2001 | Bertram |
| 2001/0051949 A1 | 12/2001 | Carey et al. |
| 2001/0056522 A1 | 12/2001 | Satyanarayana |
| 2002/0032677 A1 | 3/2002 | Morgenthaler et al. |
| 2002/0033848 A1 | 3/2002 | Sciammarella et al. |
| 2002/0065708 A1 | 5/2002 | Senay et al. |
| 2002/0091694 A1 | 7/2002 | Senay et al. |
| 2002/0091707 A1 | 7/2002 | Hrle et al. |
| 2002/0095360 A1 | 7/2002 | Keller |
| 2002/0095416 A1 | 7/2002 | Joao |
| 2002/0095658 A1 | 7/2002 | Schwols |
| 2002/0103705 A1 | 8/2002 | Shulman |
| 2002/0116120 A1 | 8/2002 | Brady |
| 2002/0174201 A1 | 11/2002 | Ruiz et al. |
| 2002/0188638 A1 | 12/2002 | Ramer et al. |
| 2002/0194119 A1 | 12/2002 | Wright et al. |
| 2002/0196229 A1 | 12/2002 | Chen et al. |
| 2003/0028560 A1 | 2/2003 | Kudrolli et al. |
| 2003/0036927 A1 | 2/2003 | Bowen |
| 2003/0039948 A1 | 2/2003 | Donahue |
| 2003/0061132 A1 | 3/2003 | Mason et al. |
| 2003/0093755 A1 | 5/2003 | O'Carroll |
| 2003/0105759 A1 | 6/2003 | Bess et al. |
| 2003/0115481 A1 | 6/2003 | Baird et al. |
| 2003/0120675 A1 | 6/2003 | Stauber et al. |
| 2003/0126102 A1 | 7/2003 | Borthwick |

(56) References Cited

U.S. PATENT DOCUMENTS

| | | |
|---|---|---|
| 2003/0130993 A1 | 7/2003 | Mendelevitch et al. |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0196108 A1 | 10/2003 | Kung |
| 2003/0212718 A1 | 11/2003 | Tester |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0044648 A1 | 3/2004 | Anfindsen et al. |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0117345 A1 | 6/2004 | Bamford et al. |
| 2004/0117387 A1 | 6/2004 | Civetta et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0148301 A1 | 7/2004 | McKay et al. |
| 2004/0163039 A1 | 8/2004 | Gorman |
| 2004/0193600 A1 | 9/2004 | Kaasten et al. |
| 2004/0205492 A1 | 10/2004 | Newsome |
| 2004/0215649 A1 | 10/2004 | Whalen et al. |
| 2004/0221223 A1 | 11/2004 | Yu et al. |
| 2004/0236688 A1 | 11/2004 | Bozeman |
| 2004/0236711 A1 | 11/2004 | Nixon et al. |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039116 A1 | 2/2005 | Slack-Smith |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0091186 A1 | 4/2005 | Elish |
| 2005/0097441 A1 | 5/2005 | Herbach et al. |
| 2005/0097482 A1 | 5/2005 | Hanson et al. |
| 2005/0108231 A1 | 5/2005 | Findleton et al. |
| 2005/0114763 A1 | 5/2005 | Nonomura et al. |
| 2005/0125715 A1 | 6/2005 | Di Franco et al. |
| 2005/0131964 A1 | 6/2005 | Saxena |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2005/0289524 A1 | 12/2005 | McGinnes |
| 2006/0026120 A1 | 2/2006 | Carolan et al. |
| 2006/0026170 A1 | 2/2006 | Kreitler et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0053097 A1 | 3/2006 | King et al. |
| 2006/0053170 A1 | 3/2006 | Hill et al. |
| 2006/0059139 A1 | 3/2006 | Robinson |
| 2006/0059423 A1 | 3/2006 | Lehmann et al. |
| 2006/0062426 A1 | 3/2006 | Levy et al. |
| 2006/0074866 A1 | 4/2006 | Chamberlain et al. |
| 2006/0074881 A1 | 4/2006 | Vembu et al. |
| 2006/0080139 A1 | 4/2006 | Mainzer |
| 2006/0080316 A1 | 4/2006 | Gilmore et al. |
| 2006/0080619 A1 | 4/2006 | Carlson et al. |
| 2006/0093222 A1 | 5/2006 | Saffer et al. |
| 2006/0095521 A1 | 5/2006 | Patinkin |
| 2006/0106847 A1 | 5/2006 | Eckardt et al. |
| 2006/0116991 A1 | 6/2006 | Calderwood |
| 2006/0129746 A1 | 6/2006 | Porter |
| 2006/0136513 A1 | 6/2006 | Ngo et al. |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0149596 A1 | 7/2006 | Surpin et al. |
| 2006/0155654 A1 | 7/2006 | Plessis et al. |
| 2006/0161558 A1 | 7/2006 | Tamma et al. |
| 2006/0178915 A1 | 8/2006 | Chao |
| 2006/0203337 A1 | 9/2006 | White |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0248084 A1 | 11/2006 | Sack et al. |
| 2006/0253502 A1 | 11/2006 | Raman et al. |
| 2006/0265397 A1 | 11/2006 | Bryan et al. |
| 2006/0265417 A1 | 11/2006 | Amato et al. |
| 2006/0265758 A1 | 11/2006 | Khandelwal et al. |
| 2006/0271277 A1 | 11/2006 | Hu et al. |
| 2006/0277460 A1 | 12/2006 | Forstall et al. |
| 2006/0279630 A1 | 12/2006 | Aggarwal et al. |
| 2006/0288056 A1 | 12/2006 | Yamakawa et al. |
| 2007/0000999 A1 | 1/2007 | Kubo et al. |
| 2007/0011150 A1 | 1/2007 | Frank |
| 2007/0016363 A1 | 1/2007 | Huang et al. |
| 2007/0018986 A1 | 1/2007 | Hauser |
| 2007/0038646 A1 | 2/2007 | Thota |
| 2007/0038962 A1 | 2/2007 | Fuchs et al. |
| 2007/0043686 A1 | 2/2007 | Teng et al. |
| 2007/0050429 A1 | 3/2007 | Goldring et al. |
| 2007/0057966 A1 | 3/2007 | Ohno et al. |
| 2007/0061487 A1 | 3/2007 | Moore et al. |
| 2007/0061752 A1 | 3/2007 | Cory |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0113164 A1 | 5/2007 | Hansen et al. |
| 2007/0136095 A1 | 6/2007 | Weinstein |
| 2007/0143253 A1 | 6/2007 | Kostamaa et al. |
| 2007/0150369 A1 | 6/2007 | Zivin |
| 2007/0168292 A1 | 7/2007 | Jogand-Coulomb et al. |
| 2007/0168871 A1 | 7/2007 | Jenkins |
| 2007/0174760 A1 | 7/2007 | Chamberlain et al. |
| 2007/0185850 A1 | 8/2007 | Walters et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0233756 A1 | 10/2007 | D'Souza et al. |
| 2007/0240062 A1 | 10/2007 | Christena et al. |
| 2007/0245339 A1 | 10/2007 | Bauman et al. |
| 2007/0260648 A1 | 11/2007 | Friesenhahn et al. |
| 2007/0266336 A1 | 11/2007 | Nojima et al. |
| 2007/0271212 A1 | 11/2007 | Jones et al. |
| 2007/0271317 A1 | 11/2007 | Carmel |
| 2007/0284433 A1 | 12/2007 | Domenica et al. |
| 2007/0294643 A1 | 12/2007 | Kyle |
| 2007/0299697 A1 | 12/2007 | Friedlander et al. |
| 2008/0015970 A1 | 1/2008 | Brookfield et al. |
| 2008/0016155 A1 | 1/2008 | Khalatian |
| 2008/0040653 A1* | 2/2008 | Levine .................. G06Q 30/02 715/205 |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0091693 A1 | 4/2008 | Murthy |
| 2008/0104019 A1 | 5/2008 | Nath |
| 2008/0104060 A1 | 5/2008 | Abhyankar et al. |
| 2008/0104141 A1 | 5/2008 | McMahon |
| 2008/0109714 A1 | 5/2008 | Kumar et al. |
| 2008/0126951 A1 | 5/2008 | Sood et al. |

(56) References Cited

U.S. PATENT DOCUMENTS

| | | |
|---|---|---|
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0195417 A1 | 8/2008 | Surpin et al. |
| 2008/0195608 A1 | 8/2008 | Clover |
| 2008/0195672 A1 | 8/2008 | Hamel et al. |
| 2008/0201339 A1 | 8/2008 | McGrew |
| 2008/0215546 A1 | 9/2008 | Baum et al. |
| 2008/0222295 A1 | 9/2008 | Robinson et al. |
| 2008/0249820 A1 | 10/2008 | Pathria |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270316 A1 | 10/2008 | Guidotti et al. |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0301378 A1 | 12/2008 | Carrie |
| 2008/0301643 A1 | 12/2008 | Appleton et al. |
| 2008/0313132 A1 | 12/2008 | Hao et al. |
| 2008/0313243 A1 | 12/2008 | Poston et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0031247 A1 | 1/2009 | Walter et al. |
| 2009/0031401 A1 | 1/2009 | Cudich et al. |
| 2009/0037417 A1 | 2/2009 | Shankar et al. |
| 2009/0043801 A1 | 2/2009 | Leclair |
| 2009/0055251 A1 | 2/2009 | Shah et al. |
| 2009/0088964 A1 | 4/2009 | Schaaf et al. |
| 2009/0089651 A1 | 4/2009 | Herberger et al. |
| 2009/0106178 A1 | 4/2009 | Chu |
| 2009/0106308 A1 | 4/2009 | Killian et al. |
| 2009/0112678 A1 | 4/2009 | Luzardo |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150868 A1 | 6/2009 | Chakra et al. |
| 2009/0164387 A1 | 6/2009 | Armstrong et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172669 A1 | 7/2009 | Bobak et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0199106 A1 | 8/2009 | Jonsson et al. |
| 2009/0216562 A1 | 8/2009 | Faulkner et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0240664 A1 | 9/2009 | Dinker et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0254970 A1 | 10/2009 | Agarwal et al. |
| 2009/0254971 A1 | 10/2009 | Herz |
| 2009/0271343 A1 | 10/2009 | Vaiciulis et al. |
| 2009/0271435 A1 | 10/2009 | Yako et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0313223 A1 | 12/2009 | Rantanen |
| 2009/0313311 A1 | 12/2009 | Hoffmann et al. |
| 2009/0313463 A1 | 12/2009 | Pang et al. |
| 2009/0319891 A1 | 12/2009 | MacKinlay |
| 2010/0011282 A1 | 1/2010 | Dollard et al. |
| 2010/0036831 A1 | 2/2010 | Vemuri et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070489 A1 | 3/2010 | Aymeloglu et al. |
| 2010/0070523 A1 | 3/2010 | Delgo et al. |
| 2010/0070842 A1 | 3/2010 | Aymeloglu et al. |
| 2010/0070844 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076813 A1 | 3/2010 | Ghosh et al. |
| 2010/0076939 A1 | 3/2010 | Iwaki et al. |
| 2010/0082541 A1 | 4/2010 | Kottomtharayil |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0138842 A1 | 6/2010 | Balko et al. |
| 2010/0145909 A1 | 6/2010 | Ngo |
| 2010/0161565 A1 | 6/2010 | Lee et al. |
| 2010/0161688 A1 | 6/2010 | Kesselman et al. |
| 2010/0162176 A1 | 6/2010 | Dunton |
| 2010/0173619 A1 | 7/2010 | Hua et al. |
| 2010/0191563 A1 | 7/2010 | Schlaifer et al. |
| 2010/0191884 A1 | 7/2010 | Holenstein et al. |
| 2010/0198684 A1 | 8/2010 | Eraker et al. |
| 2010/0199225 A1 | 8/2010 | Coleman et al. |
| 2010/0211550 A1 | 8/2010 | Daniello et al. |
| 2010/0211618 A1 | 8/2010 | Anderson et al. |
| 2010/0223260 A1 | 9/2010 | Wu |
| 2010/0228812 A1 | 9/2010 | Uomini |
| 2010/0235606 A1 | 9/2010 | Oreland et al. |
| 2010/0238174 A1 | 9/2010 | Haub et al. |
| 2010/0250412 A1 | 9/2010 | Wagner |
| 2010/0262901 A1 | 10/2010 | DiSalvo |
| 2010/0280851 A1 | 11/2010 | Merkin |
| 2010/0280857 A1 | 11/2010 | Liu et al. |
| 2010/0283787 A1 | 11/2010 | Hamedi et al. |
| 2010/0293174 A1 | 11/2010 | Bennett et al. |
| 2010/0306713 A1 | 12/2010 | Geisner et al. |
| 2010/0306722 A1 | 12/2010 | LeHoty et al. |
| 2010/0313119 A1 | 12/2010 | Baldwin et al. |
| 2010/0313239 A1 | 12/2010 | Chakra et al. |
| 2010/0318838 A1 | 12/2010 | Katano et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0029498 A1 | 2/2011 | Ferguson et al. |
| 2011/0029526 A1 | 2/2011 | Knight et al. |
| 2011/0047159 A1 | 2/2011 | Baid et al. |
| 2011/0047540 A1 | 2/2011 | Williams et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074788 A1 | 3/2011 | Regan et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0106795 A1 | 5/2011 | Maim |
| 2011/0107196 A1 | 5/2011 | Foster |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |

(56) References Cited

U.S. PATENT DOCUMENTS

| | | |
|---|---|---|
| 2011/0153592 A1 | 6/2011 | Demarcken |
| 2011/0161096 A1 | 6/2011 | Buehler et al. |
| 2011/0161132 A1 | 6/2011 | Goel et al. |
| 2011/0161409 A1 | 6/2011 | Nair |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0173619 A1 | 7/2011 | Fish |
| 2011/0179048 A1 | 7/2011 | Satlow |
| 2011/0184813 A1 | 7/2011 | Barne et al. |
| 2011/0185316 A1 | 7/2011 | Reid et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0225482 A1 | 9/2011 | Chan et al. |
| 2011/0238495 A1 | 9/2011 | Kang |
| 2011/0238553 A1 | 9/2011 | Raj et al. |
| 2011/0251951 A1 | 10/2011 | Kolkowtiz |
| 2011/0258158 A1 | 10/2011 | Resende et al. |
| 2011/0258242 A1 | 10/2011 | Eidson et al. |
| 2011/0270705 A1 | 11/2011 | Parker |
| 2011/0270812 A1 | 11/2011 | Ruby |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0004894 A1 | 1/2012 | Butler |
| 2012/0013684 A1 | 1/2012 | Robertson et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0059853 A1 | 3/2012 | Jagota |
| 2012/0065987 A1 | 3/2012 | Farooq et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084184 A1 | 4/2012 | Raleigh |
| 2012/0106801 A1 | 5/2012 | Jackson |
| 2012/0117082 A1 | 5/2012 | Koperda et al. |
| 2012/0123989 A1 | 5/2012 | Yu et al. |
| 2012/0124179 A1 | 5/2012 | Cappio et al. |
| 2012/0131512 A1 | 5/2012 | Takeuchi et al. |
| 2012/0136804 A1 | 5/2012 | Lucia |
| 2012/0137235 A1 | 5/2012 | Ts et al. |
| 2012/0144335 A1 | 6/2012 | Abeln et al. |
| 2012/0150791 A1 | 6/2012 | Willson |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173985 A1 | 7/2012 | Peppel |
| 2012/0180002 A1 | 7/2012 | Campbell et al. |
| 2012/0188252 A1 | 7/2012 | Law |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0197657 A1 | 8/2012 | Prodanovic |
| 2012/0197660 A1 | 8/2012 | Prodanovic |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226590 A1 | 9/2012 | Love et al. |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0284670 A1 | 11/2012 | Kashik et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0323888 A1 | 12/2012 | Osann, Jr. |
| 2012/0330801 A1 | 12/2012 | McDougal et al. |
| 2012/0330908 A1 | 12/2012 | Stowe et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0036346 A1 | 2/2013 | Cicerone |
| 2013/0046635 A1 | 2/2013 | Grigg et al. |
| 2013/0046842 A1 | 2/2013 | Muntz et al. |
| 2013/0055264 A1 | 2/2013 | Burr et al. |
| 2013/0060742 A1 | 3/2013 | Chang et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0097130 A1 | 4/2013 | Bingol et al. |
| 2013/0097482 A1 | 4/2013 | Marantz et al. |
| 2013/0101159 A1 | 4/2013 | Chao et al. |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0124567 A1 | 5/2013 | Balinsky et al. |
| 2013/0150004 A1 | 6/2013 | Rosen |
| 2013/0151148 A1 | 6/2013 | Parundekar et al. |
| 2013/0151305 A1 | 6/2013 | Akinola et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0311375 A1 | 11/2013 | Priebatsch |
| 2013/0318060 A1 | 11/2013 | Chang et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0089339 A1 | 3/2014 | Siddiqui et al. |

(56) References Cited

U.S. PATENT DOCUMENTS

| | | |
|---|---|---|
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0129261 A1 | 5/2014 | Bothwell et al. |
| 2014/0129936 A1 | 5/2014 | Richards et al. |
| 2014/0149272 A1 | 5/2014 | Hirani et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0181833 A1 | 6/2014 | Bird et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0208281 A1 | 7/2014 | Ming et al. |
| 2014/0214579 A1 | 7/2014 | Shen et al. |
| 2014/0222521 A1 | 7/2014 | Chait |
| 2014/0222793 A1 | 8/2014 | Sadkin et al. |
| 2014/0244284 A1 | 8/2014 | Smith |
| 2014/0244388 A1 | 8/2014 | Manouchehri et al. |
| 2014/0267294 A1 | 9/2014 | Ma |
| 2014/0267295 A1 | 9/2014 | Sharma |
| 2014/0279824 A1 | 9/2014 | Tamayo |
| 2014/0310266 A1 | 10/2014 | Greenfield |
| 2014/0316911 A1 | 10/2014 | Gross |
| 2014/0324876 A1 | 10/2014 | Konik et al. |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0344231 A1 | 11/2014 | Stowe et al. |
| 2014/0358829 A1 | 12/2014 | Hurwitz |
| 2015/0019394 A1 | 1/2015 | Unser et al. |
| 2015/0026622 A1 | 1/2015 | Roaldson et al. |
| 2015/0039886 A1 | 2/2015 | Kahol et al. |
| 2015/0046870 A1 | 2/2015 | Goldenberg et al. |
| 2015/0073954 A1 | 3/2015 | Braff |
| 2015/0089353 A1 | 3/2015 | Folkening |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0106347 A1 | 4/2015 | McGrew et al. |
| 2015/0106379 A1 | 4/2015 | Elliot et al. |
| 2015/0112956 A1 | 4/2015 | Chang et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta |
| 2015/0178877 A1 | 6/2015 | Bogomolov et al. |
| 2015/0186483 A1 | 7/2015 | Tappan et al. |
| 2015/0186821 A1 | 7/2015 | Wang et al. |
| 2015/0187036 A1 | 7/2015 | Wang et al. |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0227295 A1 | 8/2015 | Meiklejohn et al. |
| 2015/0242397 A1 | 8/2015 | Zhuang |
| 2015/0254220 A1 | 9/2015 | Burr et al. |
| 2015/0261817 A1 | 9/2015 | Harris et al. |
| 2015/0309719 A1 | 10/2015 | Ma et al. |
| 2015/0317342 A1 | 11/2015 | Grossman et al. |
| 2015/0324868 A1 | 11/2015 | Kaftan et al. |
| 2015/0341467 A1 | 11/2015 | Lim et al. |
| 2016/0034545 A1 | 2/2016 | Shankar et al. |
| 2016/0062555 A1 | 3/2016 | Ward et al. |
| 2016/0098176 A1 | 4/2016 | Cervelli et al. |
| 2016/0110369 A1 | 4/2016 | Cervelli et al. |
| 2016/0147730 A1 | 5/2016 | Cicerone |
| 2016/0162519 A1 | 6/2016 | Stowe et al. |
| 2017/0169244 A1 | 6/2017 | McGrew et al. |

FOREIGN PATENT DOCUMENTS

| | | |
|---|---|---|
| CN | 102054015 | 5/2014 |
| DE | 102014103482 | 9/2014 |
| DE | 102014215621 | 2/2015 |
| EP | 0652513 | 5/1995 |
| EP | 1672527 | 6/2006 |
| EP | 2551799 | 1/2013 |
| EP | 2555126 | 2/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2891992 | 7/2015 |
| EP | 2911078 | 8/2015 |
| EP | 2911100 | 8/2015 |
| EP | 2940603 | 11/2015 |
| EP | 2940609 | 11/2015 |
| EP | 2993595 | 3/2016 |
| EP | 3002691 | 4/2016 |
| EP | 3009943 | 4/2016 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 2000/009529 | 2/2000 |
| WO | WO 01/025906 | 4/2001 |
| WO | WO 2001/088750 | 11/2001 |
| WO | WO 2002/065353 | 8/2002 |
| WO | WO 2005/104736 | 11/2005 |
| WO | WO 2007/133206 | 11/2007 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2010/030914 | 3/2010 |
| WO | WO 2012/025915 | 3/2012 |
| WO | WO 2012/119008 | 9/2012 |
| WO | WO 2013/010157 | 1/2013 |
| WO | WO 2013/102892 | 7/2013 |

OTHER PUBLICATIONS

U.S. Appl. No. 13/831,791, filed Mar. 15, 2013, Office Action, dated Mar. 4, 2015.
U.S. Appl. No. 13/831,791, filed Mar. 15, 2013, Final Office Action, dated Aug. 6, 2015.
U.S. Appl. No. 14/473,552, filed Aug. 29, 2014, Interview Summary, dated Feb. 24, 2015.
U.S. Appl. No. 14/135,289, filed Dec. 19, 2013, Notice of Allowance, dated Oct. 14, 2014.
U.S. Appl. No. 13/839,026, filed Mar. 15, 2013, Restriction Requirement, dated Apr. 2, 2015.
U.S. Appl. No. 14/225,006, filed Mar. 24, 2014, Final Office Action, dated Sep. 2, 2015.
U.S. Appl. No. 13/827,491, filed Mar. 14, 2013, Office Action, dated Oct. 9, 2015.
U.S. Appl. No. 14/319,765, filed Jun. 30, 2014, Final Office Action, dated Jun. 16, 2015.
U.S. Appl. No. 14/306,147, filed Jun. 16, 2014, Final Office Action, Feb. 19, 2015.
U.S. Appl. No. 14/225,006, filed Mar. 25, 2014, First Action Interview, dated Feb. 27, 2015.
U.S. Appl. No. 14/306,154, filed Jun. 16, 2014, Advisory Action, dated May 15, 2015.

(56) References Cited

OTHER PUBLICATIONS

U.S. Appl. No. 14/148,568, filed Mar. 24, 2014, Final Office Action, dated Feb. 11, 2015.
U.S. Appl. No. 14/326,738, filed Jun. 16, 2014, Office Action, dated May 26, 2015.
U.S. Appl. No. 14/473,552, filed Jan. 6, 2014, Notice of Allowance, dated Aug. 26, 2015.
U.S. Appl. No. 14/326,738, filed Jul. 9, 2014, Notice of Allowance, dated Nov. 18, 2015.
U.S. Appl. No. 14/473,552, filed Aug. 29, 2014, Notice of Allowance, dated Jul. 24, 2015.
U.S. Appl. No. 13/669,274, filed Nov. 5, 2012, Final Office Action, dated May 6, 2015.
U.S. Appl. No. 14/715,834, filed May 19, 2015, Office Action Interview, dated Apr. 13, 2016.
U.S. Appl. No. 14/504,103, filed Oct. 1, 2014, First Action Interview, dated Feb. 5, 2015.
U.S. Appl. No. 14/306,147, filed Jun. 16, 2014, First Action Interview, dated Sep. 9, 2014.
U.S. Appl. No. 14/225,160, filed Mar. 25, 2014, First Office Action Interview, dated Jul. 29, 2014.
U.S. Appl. No. 14/148,568, filed Jan. 6, 2014, Office Action, dated Mar. 26, 2015.
U.S. Appl. No. 13/196,788, filed Aug. 2, 2011, Interview Summary, dated Nov. 25, 2015.
U.S. Appl. No. 13/167,680, filed Jun. 23, 2011, Notice of Allowance, dated Mar. 7, 2014.
U.S. Appl. No. 14/319,765, filed Jun. 30, 2014, First Office Action Interview, dated Nov. 25, 2014.
U.S. Appl. No. 14/323,935, filed Jul. 3, 2014, Office Action, dated Jun. 22, 2015.
U.S. Appl. No. 14/225,006, filed Mar. 25, 2014, First Office Action Interview, dated Sep. 10, 2014.
U.S. Appl. No. 14/323,935, filed Jul. 3, 2014, First Office Action, dated Nov. 28, 2014.
U.S. Appl. No. 14/616,080, filed Feb. 6, 2015, Notice of Allowance, dated Apr. 2, 2015.
U.S. Appl. No. 14/571,098, filed Dec. 15, 2014, First Office Action Interview, dated Aug. 5, 2015.
U.S. Appl. No. 14/222,364, filed Mar. 21, 2014, Office Action, dated Dec. 9, 2015.
U.S. Appl. No. 14/306,147, filed Jun. 16, 2014, Office Action, dated Aug. 7, 2015.
U.S. Appl. No. 14/289,599, filed May 28, 2014, Advisory Action, dated Sep. 4, 2015.
U.S. Appl. No. 14/639,606, filed Mar. 5, 2015, First Office Action Interview, dated Jul. 24, 2015.
U.S. Appl. No. 14/225,084, filed Mar. 25, 2014, Office Action, dated Sep. 11, 2015.
U.S. Appl. No. 14/225,084, filed Mar. 25, 2014, First Office Action Interview, dated Sep. 2, 2014.
U.S. Appl. No. 14/289,599, filed May 28, 2014, Final Office Action, dated May 29, 2015.
U.S. Appl. No. 14/486,991, filed Sep. 15, 2014, Notice of Allowance, dated May 1, 2015.
U.S. Appl. No. 12/556,318, filed Jun. 16, 2014, Office Action, dated Jul. 2, 2015.
U.S. Appl. No. 14/196,814, filed Mar. 4, 2014, Office Action, dated May 5, 2015.
U.S. Appl. No. 14/961,481, filed Dec. 7, 2015, Office Action Interview, dated Mar. 2, 2016.
U.S. Appl. No. 14/741,256, filed Jun. 16, 2015, Office Action, dated Feb. 9, 2016.
U.S. Appl. No. 12/556,321, filed Sep. 9, 2009, Office Action, dated Jul. 7, 2015.
U.S. Appl. No. 14/306,154, filed Jun. 16, 2014, Final Office Action, dated Mar. 11, 2015.
U.S. Appl. No. 14/268,964, filed May 2, 2014, First Office Action Interview, dated Sep. 3, 2014.
U.S. Appl. No. 14/631,633, filed Feb. 25, 2015, First Office Action Interview, dated Sep. 10, 2015.
U.S. Appl. No. 13/826,228, filed Mar. 14, 2013, Notice of Allowance, dated Mar. 27, 2015.
U.S. Appl. No. 14/746,671, filed Jun. 22, 2015, First Office Action Interview, dated Nov. 12, 2015.
U.S. Appl. No. 14/975,215, filed Dec. 18, 2015, First Office Action Interview, dated May 19, 2016.
U.S. Appl. No. 14/800,447, filed Jul. 15, 2012, Final Office Action, dated Jun. 6, 2016.
U.S. Appl. No. 13/835,688, filed Mar. 15, 2013, First Office Action Interview, dated Jun. 17, 2015.
U.S. Appl. No. 14/726,353, filed May 29, 2015, First Office Action Interview, dated Sep. 10, 2015.
U.S. Appl. No. 14/294,098, filed Jun. 2, 2014, Final Office Action, dated Nov. 6, 2014.
U.S. Appl. No. 14/319,765, filed Jun. 30, 2014, First Office Action Interview, dated Feb. 4, 2015.
U.S. Appl. No. 14/326,738, filed Jul. 9, 2014, First Office Action Interview, dated Mar. 31, 2015.
U.S. Appl. No. 14/225,084, filed Mar. 25, 2014, Notice of Allowance, dated May 4, 2015.
U.S. Appl. No. 14/813,749, filed Jul. 30, 2015, Office Action, dated Sep. 28, 2015.
U.S. Appl. No. 14/579,752, filed Dec. 22, 2014, First Office Action Interview, dated May 26, 2015.
U.S. Appl. No. 14/676,621, filed Apr. 1, 2015, Notice of Allowance, dated Feb. 10, 2016.
U.S. Appl. No. 14/883,498, filed Oct. 14, 2015, First Office Action Interview, dated Dec. 24, 2015.
U.S. Appl. No. 14/319,765, filed Jun. 30, 2014, First Action Interview, dated Nov. 25, 2014.
U.S. Appl. No. 14/225,160, filed Mar. 24, 2014, Office Action, dated Aug. 12, 2015.
U.S. Appl. No. 14/490,612, filed Sep. 18, 2014, Final Office Action, dated Aug. 18, 2015.
U.S. Appl. No. 14/306,147, filed Jun. 16, 2014, Final Office Action, dated Feb. 19, 2015.
U.S. Appl. No. 14/225,084, filed Mar. 25, 2014, First Action Interview, dated Feb. 20, 2015.
U.S. Appl. No. 14/326,738, filed Jul. 9, 2014, First Action Interview, dated Dec. 2, 2014.
U.S. Appl. No. 14/473,860, filed Aug. 29, 2014, Notice of Allowance, dated Jan. 5, 2015.
U.S. Appl. No. 13/196,788, filed Aug. 2, 2011, Notice of Allowance, dated Dec. 18, 2015.
U.S. Appl. No. 14/842,734, filed Sep. 1, 2015, First Office Action Interview, dated Nov. 19, 2015.
U.S. Appl. No. 14/479,160, filed Sep. 5, 2014, First Office Action Interview, dated Apr. 20, 2016.
U.S. Appl. No. 14/294,098, filed Jun. 2, 2014, First Office Action Interview, dated Aug. 15, 2014.
U.S. Appl. No. 14/451,221, filed Aug. 4, 2014, Notice of Allowance, dated Aug. 4, 2015.
U.S. Appl. No. 14/225,006, filed Mar. 25, 2014, First Office Action Interview, dated Feb. 27, 2015.
U.S. Appl. No. 14/504,103, filed Oct. 1, 2014, Notice of Allowance, dated May 18, 2015.
U.S. Appl. No. 13/747,170, filed Jan. 22, 2013, Notice of Allowance, dated Apr. 4, 2014.
U.S. Appl. No. 14/579,752, filed Dec. 22, 2014, Final Office Action, dated Aug. 19, 2015.
U.S. Appl. No. 14/225,160, filed Mar. 25, 2014, Final Office Action, dated Feb. 11, 2015.
U.S. Appl. No. 14/306,154, filed Jun. 16, 2014, Final Office Action, dated Nov. 16, 2015.
U.S. Appl. No. 14/746,671, filed Jun. 22, 2015, Notice of Allowance, dated Jan. 21, 2016.
U.S. Appl. No. 13/247,987, filed Sep. 28, 2011, Office Action, dated Apr. 2, 2015.
U.S. Appl. No. 14/552,336, filed Nov. 24, 2014, Notice of Allowance, dated Nov. 3, 2015.

(56) References Cited

OTHER PUBLICATIONS

U.S. Appl. No. 14/225,160, filed Mar. 25, 2014, First Office Action Interview, dated Oct. 22, 2014.
U.S. Appl. No. 14/225,160, filed Mar. 25, 2014, Advisory Action, dated May 20, 2015.
U.S. Appl. No. 14/306,138, filed Jun. 16, 2014, First Office Action Interview, dated Sep. 23, 2015.
U.S. Appl. No. 14/486,991, filed Sep. 15, 2014, Office Action, dated Mar. 10, 2015.
U.S. Appl. No. 13/167,680, filed Jun. 23, 2011, Office Action, dated Sep. 26, 2012.
U.S. Appl. No. 13/839,026, filed Mar. 15, 2013, Office Action, dated Aug. 4, 2015.
U.S. Appl. No. 14/504,103, filed Oct. 1, 2014, First Office Action Interview, dated Mar. 31, 2015.
U.S. Appl. No. 14/639,606, filed Mar. 5, 2015, Final Office Action, dated Oct. 16, 2015.
U.S. Appl. No. 14/726,211, filed May 29, 2015, Office Action, dated Apr. 5, 2016.
U.S. Appl. No. 14/323,935, filed Jul. 3, 2014, First Office Action Interview, dated Mar. 31, 2015.
U.S. Appl. No. 14/715,834, filed May 19, 2015, First Office Action Interview, dated Feb. 19, 2016.
U.S. Appl. No. 14/148,568, filed Jan. 6, 2014, Notice of Allowance, dated Aug. 26, 2015.
U.S. Appl. No. 14/265,637, filed Apr. 30, 2014, Notice of Allowance, dated Feb. 13, 2015.
U.S. Appl. No. 14/289,596, filed May 28, 2014, Advisory Action, dated Apr. 30, 2015.
U.S. Appl. No. 14/225,084, filed Mar. 25, 2014, First Office Action Interview, dated Feb. 20, 2015.
U.S. Appl. No. 14/451,221, filed Aug. 4, 2014, Ex Parte Quayle Action, Apr. 6, 2015.
U.S. Appl. No. 14/289,596, filed May 28, 2014, Final Office Action, dated Jan. 26, 2015.
U.S. Appl. No. 15/438,453, filed Feb. 21, 2017, Notice of Allowance, dated May 10, 2017.
U.S. Appl. No. 14/571,098, filed Dec. 15, 2014, First Office Action Interview, dated Nov. 10, 2015.
U.S. Appl. No. 13/247,987, filed Sep. 28, 2011, Office Action, dated Sep. 22, 2015.
U.S. Appl. No. 12/556,321, filed Sep. 9, 2009, Final Office Action, dated Feb. 25, 2016.
U.S. Appl. No. 14/800,447, filed Jul. 15, 2012, First Office Action Interview, dated Dec. 10, 2010.
U.S. Appl. No. 14/639,606, filed Mar. 5, 2015, First Office Action Interview, dated May 18, 2015.
U.S. Appl. No. 13/167,680, filed Jun. 23, 2011, Final Office Action, dated Mar. 13, 2013.
U.S. Appl. No. 14/578,389, filed Dec. 20, 2014, Notice of Allowance, dated Oct. 7, 2016.
U.S. Appl. No. 14/102,394, filed Dec. 10, 2013, Notice of Allowance, dated Aug. 25, 2014.
U.S. Appl. No. 14/715,834, filed May 19, 2015, First Office Action Interview, dated Mar. 14, 2016.
U.S. Appl. No. 14/294,098, filed Jun. 2, 2014, Notice of Allowance, dated Dec. 29, 2014.
U.S. Appl. No. 14/289,599, filed May 28, 2014, First Office Action Interview, dated Jul. 22, 2014.
U.S. Appl. No. 14/148,568, filed Jan. 6, 2014, Final Office Action, dated Oct. 22, 2014.
U.S. Appl. No. 13/669,274, filed Nov. 5, 2012, Office Action, dated May 2, 2016.
U.S. Appl. No. 14/192,767, filed Feb. 27, 2014, Notice of Allowance, dated Dec. 16, 2014.
U.S. Appl. No. 14/289,596, filed May 28, 2014, First Office Action Interview, dated Jul. 18, 2014.
U.S. Appl. No. 14/306,138, filed Jun. 16, 2014, Final Office Action, dated Sep. 14, 2015.
U.S. Appl. No. 14/306,138, filed Jun. 16, 2014, Interview Summary, dated Dec. 3, 2015.
U.S. Appl. No. 14/306,154, filed Jun. 16, 2014, Office Action, dated Jul. 6, 2015.
U.S. Appl. No. 14/108,187, filed Dec. 16, 2013, Notice of Allowance, dated Aug. 29, 2014.
U.S. Appl. No. 13/669,274, filed Nov. 5, 2012, Advisory Action, dated Aug. 26, 2015.
U.S. Appl. No. 14/268,964, filed May 2, 2014, Notice of Allowance, dated Dec. 3, 2014.
U.S. Appl. No. 14/306,138, filed Jun. 16, 2014, Final Office Action, dated Feb. 18, 2015.
U.S. Appl. No. 12/556,318, filed Sep. 9, 2009, Notice of Allowance, dated Apr. 11, 2016.
U.S. Appl. No. 14/552,336, filed Nov. 24, 2014, First Office Action Interview, dated Jul. 20, 2015.
U.S. Appl. No. 14/578,389, filed Dec. 20, 2014, Office Action, dated Oct. 21, 2015.
U.S. Appl. No. 14/571,098, filed Dec. 15, 2014, First Office Action Interview, dated Aug. 24, 2015.
U.S. Appl. No. 13/196,788, filed Aug. 2, 2011, Office Action, dated Oct. 23, 2015.
U.S. Appl. No. 14/578,389, filed Dec. 20, 2014, Office Action, dated Apr. 22, 2016.
U.S. Appl. No. 13/167,680, filed Jun. 23, 2011, Ex-Parte Quayle Office Action, May 23, 2013.
U.S. Appl. No. 12/556,318, filed Sep. 9, 2009, Notice of Allowance, dated Nov. 2, 2015.
U.S. Appl. No. 14/306,154, filed Jun. 16, 2014, First Office Action Interview, dated Sep. 9, 2014.
U.S. Appl. No. 14/451,221, filed Aug. 4, 2014, Office Action, dated Oct. 21, 2014.
U.S. Appl. No. 14/580,218, filed Dec. 23, 2014, Office Action, dated Jun. 26, 2015.
U.S. Appl. No. 14/996,179, filed Jan. 14, 2016, Notice of Allowance, dated Oct. 24, 2016.
U.S. Appl. No. 14/278,963, filed May 15, 2014, Notice of Allowance, dated Sep. 2, 2015.
U.S. Appl. No. 14/734,772, filed Jun. 9, 2015, First Office Action Interview, dated Jul. 24, 2015.
U.S. Appl. No. 14/734,772, filed Jun. 9, 2015, First Office Action Interview, dated Oct. 30, 2015.
U.S. Appl. No. 11/709,462, filed Feb. 21, 2007, Final Office Action, dated Jan. 7, 2011.
U.S. Appl. No. 14/746,671, filed Jun. 22, 2015, First Office Action Interview, dated Sep. 28, 2015.
U.S. Appl. No. 14/961,830, filed Dec. 7, 2015, Office Action, dated May 20, 2016.
U.S. Appl. No. 14/849,454, filed Sep. 9, 2015, Notice of Allowance, dated May 25, 2016.
U.S. Appl. No. 14/278,963, filed May 15, 2014, Final Office Action, dated Jan. 30, 2015.
U.S. Appl. No. 11/709,462, filed Feb. 21, 2007, Final Office Action, dated Mar. 26, 2010.
U.S. Appl. No. 11/709,462, filed Feb. 21, 2007, Office Action, dated May 25, 2012.
U.S. Appl. No. 14/883,498, filed Oct. 14, 2015, Office Action, dated Mar. 17, 2016.
U.S. Appl. No. 14/800,447, filed Jul. 15, 2015, Interview Summary, dated Mar. 3, 2016.
U.S. Appl. No. 11/709,462, filed Feb. 21, 2007, Final Office Action, dated Dec. 2, 2012.
U.S. Appl. No. 11/709,462, filed Feb. 21, 2007, Notice of Allowance, dated Aug. 27, 2014.
U.S. Appl. No. 14/841,338, filed Aug. 31, 2015, Office Action, dated Feb. 18, 2016.
U.S. Appl. No. 14/571,098, filed Dec. 15, 2014, First Office Action Interview, dated Mar. 11, 2015.
U.S. Appl. No. 14/734,772, filed Jun. 9, 2015, Notice of Allowance, dated Apr. 27, 2016.
U.S. Appl. No. 11/709,462, filed Feb. 21, 2007, Office Action, dated Oct. 13, 2009.

(56) References Cited

OTHER PUBLICATIONS

U.S. Appl. No. 11/709,462, filed Feb. 21, 2007, Office Action, dated Sep. 1, 2010.
U.S. Appl. No. 14/871,465, filed Sep. 30, 2015, First Office Action Interview, dated Apr. 11, 2016.
U.S. Appl. No. 13/827,491, filed Mar. 14, 2013, Final Office Action, dated Jun. 22, 2015.
U.S. Appl. No. 14/871,465, filed Sep. 30, 2015, First Office Action Interview, dated Feb. 9, 2016.
U.S. Appl. No. 15/446,917, filed Aug. 29, 2017, Notice of Allowance, dated Aug. 24, 2017.
U.S. Appl. No. 15/446,917, filed Aug. 29, 2017, Office Action, dated Apr. 21, 2017.
Abbey, Kristen, "Review of Google Docs," May 1, 2007, pp. 2.
Official Communication for European Patent Application No. 14180321.3 dated Apr. 17, 2015.
Official Communication for European Patent Application No. 15190307.7 dated Feb. 19, 2016.
Official Communication for European Patent Application No. 15188106.7 dated Feb. 3, 2016.
Official Communication for European Patent Application No. 14187996.5 dated Feb. 12, 2015.
Official Communication for New Zealand Patent Application No. 628263 dated Aug. 12, 2014.
Official Communication for European Patent Application No. 15155846.7 dated Jul. 8, 2015.
"GrabUp—What a Timesaver!" <http://atlchris.com/191/grabup/>, Aug. 11, 2008, pp. 3.
Microsoft, "Registering an Application to a URI Scheme," <http://msdn.microsoft.com/en-us/library/aa767914.aspx>, printed Apr. 4, 2009 in 4 pages.
Palmas et al., "An Edge-Bunding Layout for Interactive Parallel Coordinates" 2014 IEEE Pacific Visualization Symposium, pp. 57-64.
Kwout, <http://web.archive.ordweb/20080905132448/http://www.kwout.com/> Sep. 5, 2008, pp. 2.
Official Communication for New Zealand Patent Application No. 622473 dated Jun. 19, 2014.
Manske, "File Saving Dialogs," <http://www.mozilla.org/editor/ui_specs/FileSaveDialogs.html>, Jan. 20, 1999, pp. 7.
Online Tech Tips, "Clip2Net—Share files, folders and screenshots easily," <http://www.online-tech-tips.com/free-software-downloads/share-files-folders-screenshotsh, Apr. 2, 2008, pp. 5.
Official Communication for Australian Patent Application No. 2014210604 dated Jun. 5, 2015.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Yang et al., "HTML Page Analysis Based on Visual Cues", A129, pp. 859-864, 2001.
European Claims in application No. 08730336.8-1951, dated Oct. 2016, 8 pages.
Bernstein et al., "Hyder—A Transactional Record Manager for Shared Flash", 5th Biennial Conference on Innovative Data Systems Research (CIDR '11), vol. 12, Asilomar, California, Jan. 9-12, 2011.
Li et al., "Interactive Multimodal Visual Search on Mobile Device," IEEE Transactions on Multimedia, vol. 15, No. 3, Apr. 1, 2013, pp. 594-607.
Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.
"Hbase-Hbase Home," downloaded from the internet on Sep. 14, 2011, http://hbase.appache.org, 1 page.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Official Communication for European Patent Application No. 14187739.9 dated Jul. 6, 2015.
Map of San Jose, CA. Retrieved Oct. 2, 2013 from http://maps.bing.com.
Niepert et al., "A Dynamic Ontology for a Dynamic Reference Work", Joint Conference on Digital Libraries, Jun. 17_22, 2007, Vancouver, British Columbia, Canada, pp. 1-10.
Microsoft, "How Word Creates and Recovers the AutoRecover files," <http://support.microsoft.com/kb/107686>, Article ID: 107686, printed Feb. 11, 2010 in 3 pages.
Griffith, Daniel A., "A Generalized Huff Model," Geographical Analysis, Apr. 1982, vol. 14, No. 2, pp. 135-144.
Official Communication for Australian Patent Application No. 2014213553 dated May 7, 2015.
Official Communication for European Patent Application No. 09813695.5 dated Apr. 9, 2014.
Official Communication in New Zealand Application No. 628840 dated Aug. 28, 2014.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Official Communication for European Patent Application No. 09813693.0 dated Apr. 8, 2014.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Huang et al., "Systematic and Integrative Analysis of Large Gene Lists Using DAVID Bioinformatics Resources," Nature Protocols, 4.1, 2008, 44-57.
"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Official Communication for Canadian Patent Application No. 2,677,464 dated Jan. 16, 2013.
Official Communication for Australian Patent Application No. 2014202442 dated Mar. 19, 2015.
Official Communication for European Patent Application No. 14189802.3 dated May 11, 2015.
Ask Drexel University Knowledge Base, "How to: Auto Save a Document Before Printing in Word 2007," published Nov. 13, 2007.
Baker et al., "Megastore: Providing Scalable, Highly Available Storage for Interactive Services", 5th Biennial Conference on Innovative Data Systems Research (CIDR '11), Asilomar, California, Jan. 9-12, 2011.
Official Communication for Australian Patent Application No. 2012203606 dated Jan. 22, 2014.
Definition "Overlay", downloaded Jan. 22, 2015, 1 page.
Schroder, Stan, "15 Ways to Create Website Screenshots," <http://mashable.com/2007/08/24/web-screenshots/>, Aug. 24, 2007, pp. 2.
Shi et al., "A Scalable Implementation of Malware Detection Based on Network Connection Behaviors," 2013 International Conference on Cyber-Enabled Distributed Computing Knowledge Discovery, IEEE, Oct. 10, 2013, pp. 59-66.
Manno et al., "Introducing Collaboration in Single-user Applications through the Centralized Control Architecture," 2010, pp. 10.
Official Communication for European Patent Application No. 14197895.7 dated Apr. 28, 2015.
Wang et al., "Research on a Clustering Data De-Duplication Mechanism Based on Bloom Filter," IEEE 2010, 5 pages.
Nitro, "Trick: How to Capture a Screenshot as PDF, Annotate, Then Share It," <http://blog.nitropdf.com/2008/03/04/trick-how-to-capture-a-screenshot-as-pdf-annotate-it-then-shareh, Mar. 4, 2008, pp. 2.
Claims for Australian Patent Application No. 2012203606 dated Jan. 2014.

(56) References Cited

OTHER PUBLICATIONS

Liu, Tianshun, "Combining Gis and the Huff Model to Analyze Suitable Locations for a New Asian Supermarket in the Minneapolis and St. Paul, Minnesota USA," Papers in Resource Analysis, 2012, vol. 14, pp. 8.
Galliford, Miles, "SnagIt Versus Free Screen Capture Software: Critical Tools for Website Owners," <http://www.subhub.com/articles/free-screen-capture-software>, Mar. 27, 2008, pp. 11.
Official Communication for New Zealand Patent Application No. 622517 dated Apr. 3, 2014.
Antoshenkov, Gennady, "Dictionary-Based Order-Preserving String Compression", The VLDB Journal, pp. 26-39, 1997.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Ferreira et al., "A Scheme for Analyzing Electronic Payment Systems," Basil 1997.
Keylines.com, "KeyLines Datasheet," Mar. 2014, <http://keylines.com/wp-content/uploads/2014/03/KeyLines-datasheet.pdf> downloaded May 12, 2014 in 2 pages.
Official Communication for Canadian Patent Application No. 2831660 dated Jun. 9, 2015.
Official Communication for New Zealand Patent Application No. 628495 dated Aug. 19, 2014.
Umagandhi et al., "Search Query Recommendations Using Hybrid User Profile with Query Logs," International Journal of Computer Applications, vol. 80, No. 10, Oct. 1, 2013, pp. 7-18.
Official Communication for New Zealand Patent Application No. 622513 dated Apr. 3, 2014.
Official Communication for Great Britain Patent Application No. 1404499.4 dated Aug. 20, 2014.
"Using Whois Based Geolocation and Google Maps API for Support Cybercrime Investigations," http://wseas.us/e-library/conferences/2013/Dubrovnik/TELECIRC/TELECIRC-32.pdf.
Canese et al., "Chapter 2: PubMed: The Bibliographic Database," The NCBI Handbook, Oct. 2002, pp. 1-10.
Thompson, Mick, "Getting Started with GEO," Getting Started with GEO, Jul. 26, 2011.
Official Communication for European Patent Application No. 14180432.8 dated Jun. 23, 2015.
Microsoft, "Introduction to Versioning," <http://office.microsoft.com/en-us/sharepointtechnolgy/HA010021576.aspx?mode=print>, 2007 in 3 pages.
Official Communication for Great Britain Patent Application No. 1408025.3 dated Nov. 6, 2014.
Hibbert et al., "Prediction of Shopping Behavior Using a Huff Model Within a GIS Framework," Healthy Eating in Context, Mar. 18, 2011, pp. 16.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Symantec Corporation, "E-Security Begins with Sound Security Policies," Announcement Symantec, Jun. 14, 2001.
Warren, Christina, "TUAW Faceoff: Screenshot apps on the firing line," <http://www.tuaw.com/2008/05/05/tuaw-faceoff-screenshot-apps-on-the-firing-lineh, May 5, 2008, pp. 11.
Official Communication for New Zealand Patent Application No. 622473 dated Mar. 27, 2014.
Official Communication for Australian Patent Application No. 2013251186 dated Mar. 12, 2015.
"A First Look: Predicting Market Demand for Food Retail using a Huff Analysis," TRF Policy Solutions, Jul. 2012, pp. 30.
Notice of Acceptance for Australian Patent Application No. 2013251186 dated Nov. 6, 2015.
Microsoft, "Using the Clipboard," <http://msdn.microsoft.com/en-us/library/ms649016.aspx>, printed Jun. 8, 2009 in 20 pages.
Devanbu et al., "Authentic Third-party Data Publication", http://www.cs.ucdavis.edu/~devanbu/authdbpub.pdf, p. 19, 2000.
Azad, Khalid, "A Visual Guide to Version Control," <http://betterexplained.com/articles/a-visual-guide-to-version-controlh, Sep. 27, 2007 in 11 pages.
Official Communication for Great Britain Patent Application No. 1404457.2 dated Aug. 14, 2014.
Hansen et al., "Analyzing Social Media Networks with NodeXL: Insights from a Connected World", Chapter 4, pp. 53-67 and Chapter 10, pp. 143-164, published September.
Official Communication for Netherlands Patent Application No. 2012438 dated Sep. 21, 2015.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
SnagIt, "SnagIt Online Help Guide," <http://download.techsmith.com/snagit/docsionlinehelp/enu/snagit_help.pdf>, TechSmith Corp., Version 8.1, printed Feb. 7, 2007, pp. 284.
Hogue et al., "Thresher: Automating the Unwrapping of Semantic Content from the World Wide Web", 14th International Conference on World Wide Web, Www 2005: Chiba, Japan, May 10-14, 2005.
Official Communication for Netherlands Patent Application No. 2012436 dated Nov. 6, 2015.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
Definition "Identify", downloaded Jan. 22, 2015, 1 page.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Official Communication for European Patent Application No. 14180142.3 dated Feb. 6, 2015.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Official Communication for European Patent Application No. 14199182.8 dated Mar. 13, 2015.
About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-graph.html retrieved on Aug. 18, 2015.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Official Communication for European Patent Application No. 14197879.1 dated Apr. 28, 2015.
Claims for European Patent Application No. 12173312.5 dated Jun. 2012.
Anonymous, "BackTult—JD Edwards One World Version Control System", in 1 page, Jul. 23, 2007.
Official Communication for Canadian Patent Application No. 2,677,464 dated Mar. 19, 2012.
Hua et al., "A Multi-attribute Data Structure with Parallel Bloom Filters for Network Services", HiPC 2006, LNCS 4297, pp. 277-288, 2006.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Official Communication for European Patent Application No. 14158861.6 dated Jun. 16, 2014.
Alur et al., "Chapter 2: IBM InfoSphere DataStage Stages," IBM InfoSphere DataStage Data Flow and Job Design, Jul. 1, 2008, pp. 35-137.
Official Communication for European Patent Application No. 12181585.6 dated Sep. 4, 2015.
Official Communication for Australian Patent Application No. 2014210614 dated Jun. 5, 2015.
Official Communication for Netherlands Patent Application No. 2013306 dated Apr. 24, 2015.
Official Communication for European Patent Application No. 14159464.8 dated Jul. 31, 2014.

(56) References Cited

OTHER PUBLICATIONS

Nolan et al., "MCARTA: A Malicious Code Automated Run-Time Analysis Framework," Homeland Security, 2012 IEEE Conference on Technologies for, Nov. 13, 2012, pages.
Rouse, Margaret, "OLAP Cube," <http://searchdatamanagement.techtarget.com/definition/OLAP-cube>, Apr. 28, 2012.
Goswami, Gautam, "Quite Writly Said!," One Brick at a Time, Aug. 21, 2005, pp. 7.
Elmasri et al., "Fundamentals of Database Systems", Fourth Edition, pp. 455-491, 2004.
Official Communication for European Patent Application No. 14159464.8 dated Aug. 20, 2014.
Palantir Technologies, "Palantir Labs—Timeline," Oct. 1, 2010, retrieved from the internet https://www.youtube.com/watch?v=JCgDW5bru9M.
Official Communication for European Patent Application No. 15165244.3 dated Aug. 27, 2015.
Perdisci et al., "Behavioral Clustering of HTTP-Based Malware and Signature Generation Using Malicious Network Traces," USENIX, Mar. 18, 2010, pp. 1-14.
Official Communication for European Patent Application No. 14159464.8 dated Sep. 22, 2014.
Official Communication for Great Britain Patent Application No. 1404489.5 dated Aug. 27, 2014.
Official Communication for Australian Patent Application No. 2014250678 dated Jun. 17, 2015.
Nierman, "Evaluating Structural Similarity in XML Documents", 6 pages, 2002.
Official Communication for European Patent Application No. 14191540.5 dated May 27, 2015.
Official Communication for European Patent Application No. 14186225.0 dated Feb. 13, 2015.
Wollrath et al., "A Distributed Object Model for the Java System," Conference on Object-Oriented Technologies and Systems, Jun. 17-21, 1996, pp. 219-231.
Microsoft, "Managing Versions and Checking Documents in and Out (Windows SharePoint Services 2.0)," <http://technet.microsoft.com/en-us/library/cc287876.aspx>, Aug. 22, 2005 in 2 pages.
Miklau et al., "Securing History: Privacy and Accountability in Database Systems", 3rd Biennial Conference on Innovative Data Systems Research (CIDR), pp. 387-396, Asilomar, California, Jan. 7-10, 2007.
Official Communication for New Zealand Patent Application No. 627962 dated Aug. 5, 2014.
"A Word About Banks and the Laundering of Drug Money," Aug. 18, 2012, http://www.golemxiv.co.uk/2012/08/a-word-about-banks-and-the-laundering-of-drug-money/.
Official Communication for Great Britain Patent Application No. 1404486.1 dated Aug. 27, 2014.
Klemmer et al., "Where Do Web Sites Come From? Capturing and Interacting with Design History," Association for Computing Machinery, CHI 2002, Apr. 20-25, 2002, Minneapolis, MN, pp. 8.
Official Communciation for Great Britain Patent Application No. 1411984.6 dated Dec. 22, 2014.
Microsoft Office—Visio, "About connecting shapes," <http://office.microsoft.com/en-us/visio-help/about-connecting-shapes-HP085050369.aspx> printed Aug. 4, 2011 in 6 pages.
International Search Report and Written Opinion for Patent Application No. PCT/US2009/056700 dated Apr. 19, 2010.
Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.
Thomson et al., "The Case for Determinism in Database Systems", The 36th International Conference on Very Large Data Bases, Proceedings of the VLDB Endowment, vol. 3, Issue No. 1, p. 11, Singapore, Sep. 13-17, 2010.
Official Communication for European Patent Application No. 14189344.6 dated Feb. 20, 2015.
European Patent Office, "Search Report" in application No. 08730336.8-1951, dated Oct. 19, 2016, 4 pages.
Official Communication for European Patent Application No. 13170952.9 dated Jan. 21, 2014.
Official Communication for European Patent Application No. 15175106.2 dated Nov. 5, 2015.
Boyce, Jim, "Microsoft Outlook 2010 Inside Out," Aug. 1, 2010, retrieved from the internet https://capdtron.files.wordpress.com/2013/01/outlook-2010-inside_out.pdf.
Microsoft Windows, "Microsoft Windows Version 2002 Print Out 2," 2002, pp. 1-6.
Wikipedia, "Federated Database System," Sep. 7, 2013, retrieved from the internet on Jan. 27, 2015 http://en.wikipedia.org/w/index.php?title=Federated_database_system&oldid=571954221.
Official Communication for Great Britain Patent Application No. 1413935.6 dated Jan. 27, 2015.
Map of San Jose, CA. Retrieved Oct. 2, 2013 from http://maps.yahoo.com.
Conner, Nancy, "Google Adds: The Missing Manual," May 1, 2008, pp. 15.
Official Communication for European Patent Application No. 15175151.8 dated Nov. 25, 2015.
International Search Report and Written Opinion in Application No. PCT/US2009/056703, dated Mar. 15, 2010.
Wright et al., "Palantir Technologies VAST 2010 Challenge Text Records _ Investigations into Arms Dealing," Oct. 29, 2010, pp. 1-10.
Gu et al., "Record Linkage: Current Practice and Future Directions," Jan. 15, 2004, pp. 32.
Official Communication for Netherlands Patent Application No. 2011729 dated Aug. 13, 2015.
Official Communication for European Patent Application No. 08730336.8 dated Jun. 6, 2012.
Official Communication for European Patent Application No. 151832721.8 dated Nov. 23, 2015.
"Money Laundering Risks and E-Gaming: A European Overview and Assessment," 2009, http://www.cf.ac.uk/socsi/resources/Levi_Final_Money_Laundering_Risks_egaming.pdf.
Huff et al., "Calibrating the Huff Model Using ArcGIS Business Analyst," SSRI, Sep. 2008, pp. 33.
Official Communication for New Zealand Patent Application No. 624557 dated May 14, 2014.
Acklen, Laura, "Absolute Beginner's Guide to Microsoft Word 2003," Dec. 24, 2003, pp. 15-18, 34-41, 308-316.
Beverley, Bill, "Windows Tips & Tricks," <http://alamopc.org/pcalamode/columns/beverley/bb0301.shtml>, Mar. 2001 in 5 pages.
Quest, "Toad for ORACLE 11.6—Guide to Using Toad," Sep. 24, 2012, pp. 1-162.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Official Communication for European Patent Application No. 15183721.8 dated Nov. 23, 2015.
Official Communication for European Patent Application No. 14189347.9 dated Mar. 4, 2015.
Chaudhuri et al., "An Overview of Business Intelligence Technology," Communications of the ACM, Aug. 2011, vol. 54, No. 8.
Official Communication for New Zealand Patent Application No. 628161 dated Aug. 25, 2014.
Peng et al., "Large-scale Incremental Processing Using Distributed Transactions and Notifications", Proceedings of the 9th USENIX Symposium on Operating Systems Design and Implementation, USENIX, p. 14, 2010.
Huff, David L., "Parameter Estimation in the Huff Model," ESRI, ArcUser, Oct.-Dec. 2003, pp. 34-36.
Official Communication for European Patent Application No. 15155845.9 dated Oct. 6, 2015.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Official Communication for European Patent Application No. 14197938.5 dated Apr. 28, 2015.

(56) References Cited

OTHER PUBLICATIONS

Delcher et al., "Identifying Bacterial Genes and Endosymbiont DNA with Glimmer," BioInformatics, vol. 23, No. 6, 2007, pp. 673-679.

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.

Official Communication for New Zealand Patent Application No. 628585 dated Aug. 26, 2014.

Bluttman et al., "Excel Formulas and Functions for Dummies," 2005, Wiley Publishing, Inc., pp. 280, 284-286.

Notice of Acceptance for Australian Patent Application No. 2014250678 dated Oct. 7, 2015.

JetScreenshot.com, "Share Screenshots via Internet in Seconds," <http://web.archive.org/web/20130807164204/http://www.jetscreenshot.com/>, Aug. 7, 2013, pp. 1.

Official Communication for European Patent Application No. 14180281.9 dated Jan. 26, 2015.

Map of San Jose, CA. Retrieved Oct. 2, 2013 from http://maps.google.com.

Chang et al., "Bigtable: A Distributed Storage System for Structured Data", Google, Inc., OSDI'06: Seventh Symposium on Operating System Design and Implementation, Seattle, WA, Nov. 2006.

Official Communication for European Patent Application No. 12173312.5 dated Oct. 25, 2012.

International Search Report for International Patent Application No. PCT/US2008/054511 dated Jul. 31, 2008.

O'Reilly.com, http://oreilly.com/digitalmedia/2006/01/01/mac-os-x-screenshot-secrets.html published Jan. 1, 2006 in 10 pages.

Sigrist, et al., "PROSITE, a Protein Domain Database for Functional Characterization and Annotation," Nucleic Acids Research, 2010, vol. 38, pp. D161-D166.

Sirotkin et al., "Chapter 13: The Processing of Biological Sequence Data at NCBI," The NCBI Handbook, Oct. 2002, pp. 1-11.

Mizrachi, Ilene, "Chapter 1: Gen Bank: The Nuckeotide Sequence Database," The NCBI Handbook, Oct. 2002, pp. 1-14.

Official Communication for Great Britain Patent Application No. 1404574.4 dated Dec. 18, 2014.

Official Communication for Netherlands Patent Application No. 2012437 dated Sep. 18, 2015.

Kitts, Paul, "Chapter 14: Genome Assembly and Annotation Process," The NCBI Handbook, Oct. 2002, pp. 1-21.

"A Quick Guide to UniProtKB Swiss-Prot & TrEMBL," Sep. 2011, pp. 2.

"The FASTA Program Package," fasta-36.3.4, Mar. 25, 2011, pp. 29.

Madden, Tom, "Chapter 16: The BLAST Sequence Analysis Tool," The NCBI Handbook, Oct. 2002, pp. 1-15.

Kahan et al., "Annotea: an Open RDF Infrastructure for Shared Web Annotations", Computer Networks, Elsevier Science Publishers B.V., vol. 39, No. 5, dated Aug. 5, 2002.

European Patent Office, "Search Report" in application No. 08730336.8-1951, dated Jun. 28, 2017.

* cited by examiner

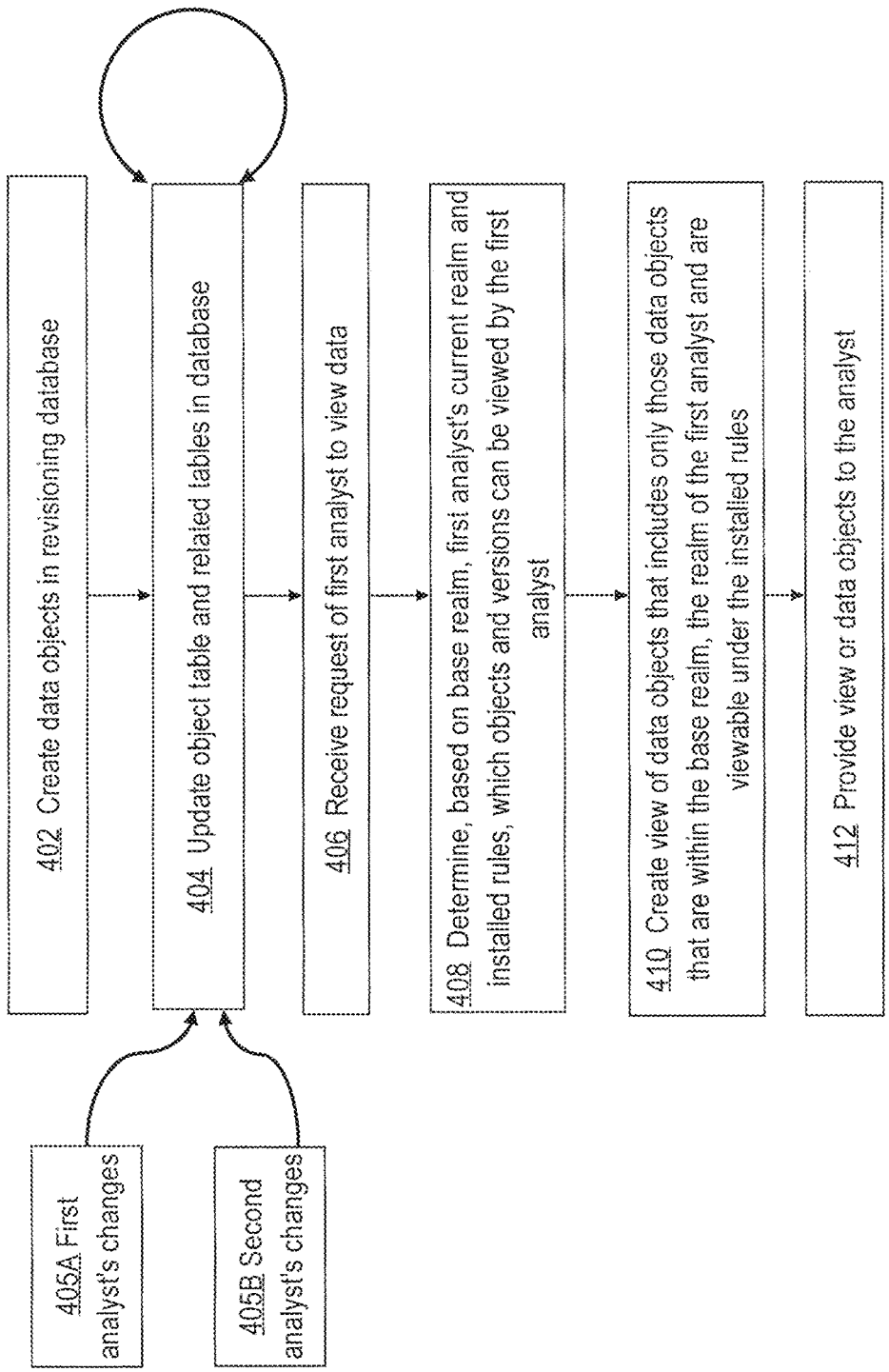

PROVIDING UNIQUE VIEWS OF DATA BASED ON CHANGES OR RULES

BENEFIT CLAIM

This application claims benefit and priority under 35 U.S.C. § 120 as a Continuation of U.S. patent application Ser. No. 15/690,099, filed Aug. 29, 2017, which is a Continuation of U.S. patent application Ser. No. 15/438,453, filed Feb. 21, 2017, now U.S. Pat. No. 9,760,733, which is a continuation of U.S. patent application Ser. No. 14/578,389, filed Dec. 20, 2014, now U.S. Pat. No. 9,576,003, which is a continuation of U.S. patent application Ser. No. 11/709,462, filed Feb. 21, 2007, now U.S. Pat. No. 8,930,331, the entire contents of which are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present disclosure generally relates to computer data systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer-based revisioning database systems store data and provide the ability to track changes in database objects and examine a history of what changes were made, which user made the changes, and when the changes were made. Generally, all users of the revisioning database have the same view of the data. However, conventional revisioning database systems are poorly suited to the needs of certain users, such as intelligence analysts. Intelligence database systems typically store highly sensitive and confidential data that is distributed on a "need to know" basis. Security considerations in intelligence analysis impose restrictions on who can access or receive particular kinds of views of data, but revisioning databases do not typically implement controls on access to views. Intelligence analysts often work on multiple discrete investigations that may draw data from the same centralized revisioning database, but one analyst is not typically allowed to view every investigation, or the data associated with every investigation, or changes made by another analyst, even if the same data is associated with that analyst's own investigations.

Further, distribution of copies of intelligence data is typically restricted, but in conventional revisioning database systems users are permitted to maintain a local mirror copy of at least a portion of the data. The use of a local mirror is not acceptable to the intelligence community. Thus, there is a need for improved ways to distribute selected views of data Further, changes in intelligence data may be associated with reasons for the changes that are useful to track and display in connection with a change history of the revisioning database. However, conventional revisioning databases do not allow a user to associate change reasons or other annotations with a change history from the database.

SUMMARY

Unique views of data are provided to realms and/or users based on changes to the data or rules. In one embodiment, a method comprises creating and storing, in a revisioning database, one or more data objects; wherein a first plurality of the data objects is associated with a base realm representing data shared across all users of the database; wherein a second plurality of the data objects is associated with one or more child realms, wherein each of the child realms represents data local to a project, wherein each of the users is associated with one or more of the child realms; wherein the revisioning database associates each data object to a realm identifier value and to a version identifier value for a plurality of versions of the data object, wherein each of the versions represents a change to the data object by any of a plurality of users; receiving a request from a first user to view a third plurality of data objects in the revisioning database; selecting, based on the base realm, the particular realm, the version identifier value for the data objects in the third plurality, and one or more rules associated with the particular realm and the first user, data objects in the third plurality that can be viewed by the first user; creating a particular data view that includes only the selected data objects; and providing a display of the particular data view to the first user.

In one embodiment, the selecting comprises selecting all objects of the third plurality that are in the base realm. In another embodiment, the selecting comprises selecting all objects of the third plurality that are in each child realm then currently associated with the first user.

In another embodiment, the method further comprises receiving definitions of one or more rules, wherein each rule specifies whether one or more data objects may be provided to a specified child realm; selecting the data objects in the third plurality based upon the rules as well as the base realm the particular realm, and the version identifier value for the data objects.

Still another embodiment provides for receiving the definitions of the one or more rules from a user, other than the first user, who is associated with realm with which the second plurality of data objects is associated. In another embodiment, the method comprises receiving a request of the first user to subscribe to the data objects in a specified child realm; determining that a change has occurred in at least some of the data objects; selecting the third plurality of data objects based on determining whether the data objects that have changed can be provided to the first user based on the base realm, the particular realm, and the version identifier value for the data objects.

In another embodiment, providing the particular data view to the first user comprises providing only particular rows of the revisioning database to the first user. In an embodiment, the creating and storing comprises creating and storing an object table comprising rows that represent versions of data objects and columns that represent, for each of the versions, an associated realm, a version value, and a pointer to a previous version.

In an embodiment, the method further comprises asynchronously concurrently receiving, from different users, a plurality of changes to one data object, and in response thereto, creating a new row in the object table for each of the changes, wherein realm columns comprise realm identifiers of realms that are then currently associated with the different users.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A illustrates displaying data from a revisioning database based on realms and rules;

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In an embodiment, a revisioning database and a method of using the revisioning database enable showing a unique view of database data to each analyst based on his or her changes to the database data, and to synchronize the view with a central repository of data. In an embodiment, a publish-subscribe model is implemented for distribution of data to analysts. Collaborative use of selected data is possible. For example, an analyst working on a particular intelligence investigation determines a view of data, which may be equivalent to identifying selected rows of an RDBMS table, for publication to other analysts, who can subscribe to the view. A subscribing analyst receives and stores only the published rows or row-equivalents. Unlike prior approaches, subscribers do not maintain a local mirror, and therefore security is increased. Each analyst can only change his/her own data.

In an embodiment, a revisioning database and a method of using the revisioning database enable showing a unique view of database data to a particular analyst among a plurality of analysts based on a set of rules governing what data can be seen by the analyst. In an embodiment, a security rules wizard generates views of the data.

I. REVISIONING DATABASE SYSTEM

The techniques described herein may be used in many different database applications. In an embodiment, a revisioning database system stores data collected in intelligence operations by intelligence analysts or other members of an intelligence community. "Intelligence," in this context, refers to information about people, places, and events that is useful to a government or military organization in relation to issues of security or defense, and may include information obtained in covert operations or open operations. Other embodiments may be used in fields other than intelligence analysis. In an embodiment, the revisioning database system records metadata about changes to stored data, facilitates UNDO and REDO operations, can receive requests to subscribe to particular data and publish updates to such data for delivery to subscribers, and performs other functions.

Figure 1:
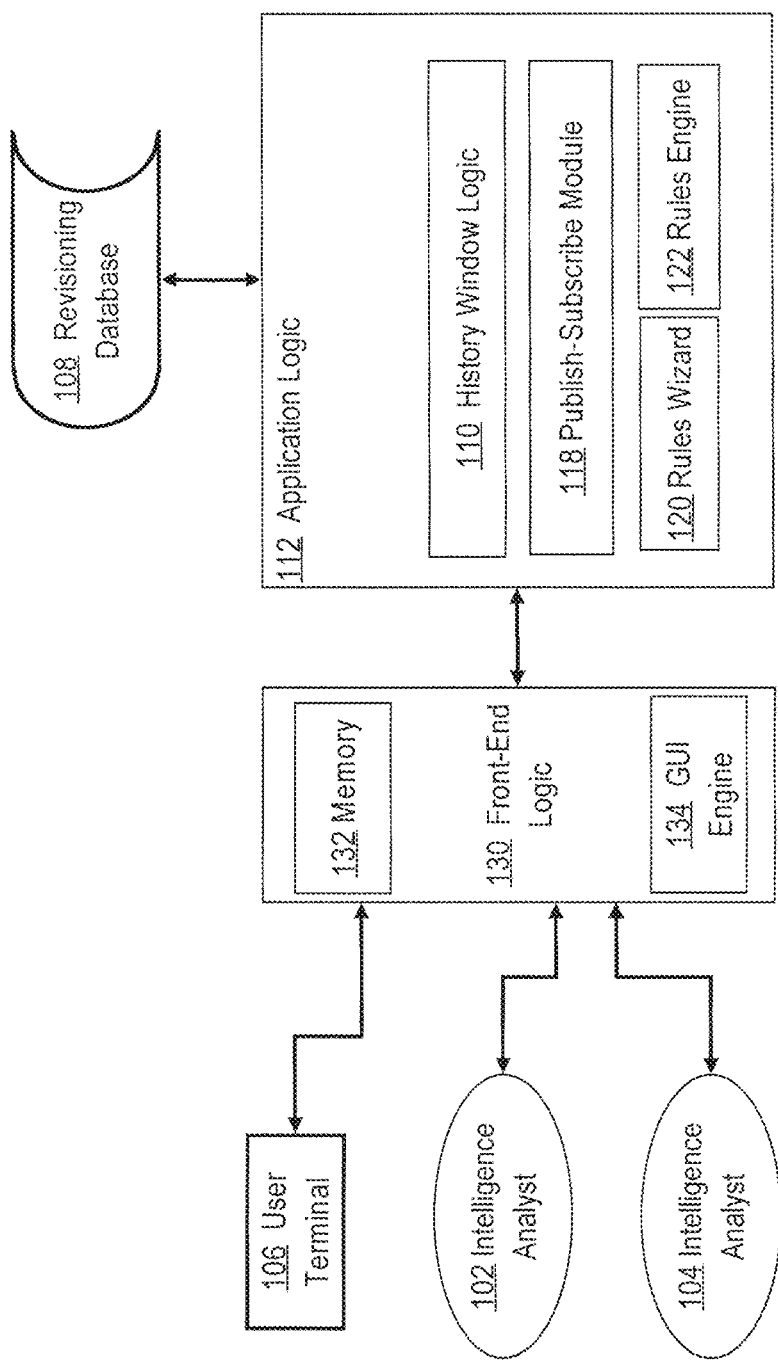
FIG. 1 illustrates a revisioning database system.

FIG. 1 illustrates a revisioning database system. A revisioning database 108 is coupled to application logic 112, which implements the functions described herein for interacting with and using the revisioning database 108 in association with data such as intelligence community data. A user terminal 106 is coupled to front-end logic 130, which is coupled to application logic 112. The user terminal 106 of FIG. 1 broadly represents any host computer of an intelligence analyst, database administrator, or other user who interacts with revisioning database 108 through application logic 112.

One or more other intelligence analysts 102, 104 can access application logic 112 through front-end logic 130 to obtain information from revisioning database 108 and to obtain services of the application logic. The intelligence analysts 102, 104 may be located in discrete security domains and different geographical locations, or may be co-located and/or within the same security domain. Each of the intelligence analysts 102, 104 may access application logic 112 through a host computer that is coupled directly or indirectly through one or more networks, network links, or internetworks to the application logic. User terminal 106 and the host computers of the intelligence analysts 102, 104 may comprise a personal computer, workstation, or other data processing system.

Front-end logic 130 comprises a memory 132 that stores copies of objects from revisioning database 108 for use in front-end operations, and a GUI engine 134 that generates graphical user interface displays for presenting data objects on user terminal 106 or displays of the intelligence analysts 102, 104.

In an embodiment, application logic 112 comprises history window logic 110, publish-subscribe module 118, rules wizard 120, and rules engine 122. History window logic 110 is configured to generate views and displays of historical states of objects in revisioning database 108 and historical states of graphs, comprising nodes representing the objects, which have been displayed by GUI engine 134. Publish-subscribe module 118 comprises logic configured to implement receiving and storing requests of analysts to subscribe to particular data views, detecting updates in data, and generating and sending publications of updated data to subscribers. Rules wizard 120 is configured to permit users to define rules that specify how objects in revisioning database 108 can be accessed and exported, as further described below. Rules engine 122 facilitates controlled publication and viewing of objects from revisioning database 108 based on realms and rules defined using the rules wizard 120.

In an embodiment, export module 114, publish-subscribe module 118, rules wizard 120 and rules engine 122 may be implemented in a single computer program or module or may be integrated into revisioning database 108. Functions of rules wizard 120 may be implemented in whole or in part in front-end logic 130. Thus, the structural separation of functional modules as shown in FIG. 1 is not required and the same functions described herein for such functional modules may be implemented structurally in any other convenient manner.

Figure 2:
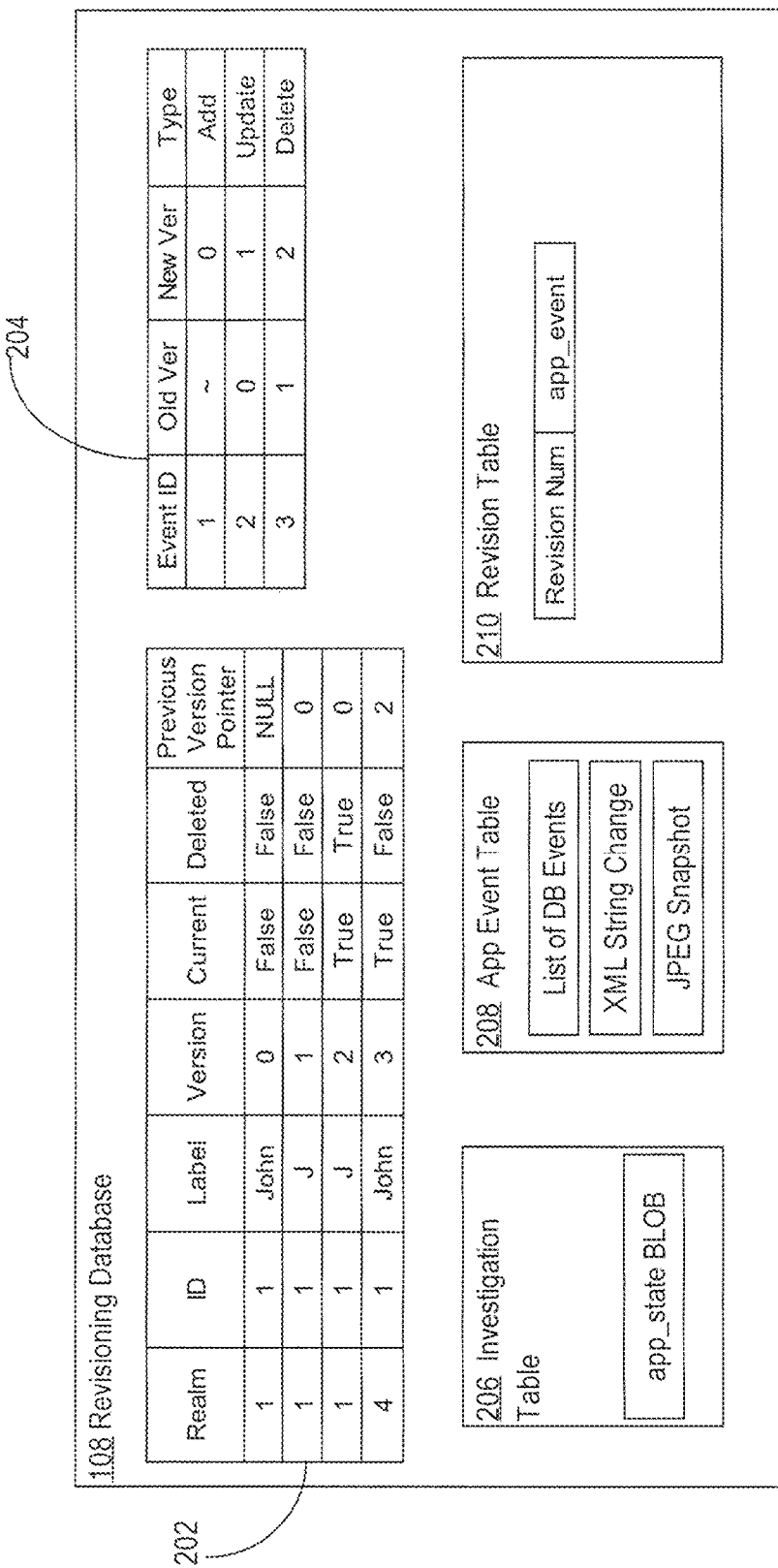
FIG. 2 illustrates internal organization of a revisioning database.

FIG. 2 illustrates internal organization of a revisioning database with example hypothetical data. In an embodiment, as an overview, revisioning database 108 comprises an object table 202, an event table 204, an investigation table 206, an "App Event" table 208, and a revision table 210. In an embodiment, revisioning database 108 may comprise other tables and functional modules for performing support functions and other functions that are not essential to the invention herein. In an embodiment, object table 202 comprises a plurality of rows that store metadata relating to successive versions of one or more objects that are stored in the revisioning database 108 as such objects undergo operations such as addition to the database, changes, and deletion. Event table 204 comprises a plurality of rows that identify, for a one or more particular database objects, all events that have occurred for that object such as adding the object to the database, updating, and deleting.

In an embodiment, object table 202 and event table 204 implement row-based journaling of object changes to provide a revisioning database useful for intelligence analysis. Further, object table 202 permits associating different versions of data in a database object with different data realms. The use of realms, which are described further below, generally enables controlled and selective publication of data to users associated with different investigations may see only particular data from the revisioning database 108.

A simplified example using the hypothetical data shown in object table 202 and event table 204 of FIG. 2 is now described. In an embodiment used herein to illustrate a clear example, the object table 202 comprises columns identifying a Realm, unique object identifier (ID), Label, Version, Current flag, a Deleted flag, and a Previous Version Pointer; other embodiments may include other columns. Further, in the following description certain numbers and other values are provided as examples, but other data types may be used in other embodiments. An example of row-based journaling of object changes to implement a revisioning database is now described, using a hypothetical scenario involving a user adding one database object, updating the object, and deleting the object.

Based on the first row of object table 202, assume that a particular database object having an ID of 1 and a label of "John" is added to the database. The object is given version 0 since this is the first version of the object that has been operated upon, and in Realm 1 version 0 is the current version and the object is not deleted. The Previous Version Pointer is null since no earlier version of the same object exists. The event of adding the object John to the database is reflected by adding a new row to event table 204. In the first row of event table 204 an event having Event ID 1 indicates that the John object, which has an object identifier of "255002," had an old version number of Null, new version number of 0, and an Add operation was performed. Successive events receive other unique event identifiers.

Now assume that the same object is updated by changing its label to "J" rather than "John." The update event is reflected by adding a second row to event table 204 in which a second event having ID 2 specifies that the old version of the John/J object was 0, the new version is 1, and the type of operation was Update. Further, because the John/J object changed, a new row is also added to the object table 202, as indicated in the second row of the object table in which object ID 1 has the new label J at version 1, and is current and not deleted. The Previous Version Pointer of the J object points to the first row of the table containing object version 0, and although FIG. 2 shows a value of "0" in the Previous Version Pointer for clarity, the Previous Version Pointer may be implemented as a pointer object rather than an integer. The Current flag of the first row of the object table 202 is changed, but otherwise the first row is not edited or updated; instead, a new row is added and the Current flags are updated to indicate that the first row is not current and the second row is current.

Next assume that the J object is deleted from the database. The third row of event table 204 reflects a Delete event for the old version 1 of the object and indicates that the new version of the deleted object is 2. A third row is also added to object table 202 and indicates that the J object at version 2 is current but also is deleted, as the Deleted flag is false. The Previous Version Pointer indicates object version 0. The preceding information all applies to Realm 1 as indicated in the first column of object table 202. However, the object table 202 also can maintain separate information for the same object in association with a different realm, such as Realm 4. In this realm, the same object having an ID of 1 is labeled John and is current but not deleted. In cooperation with application logic 112, the separation of realms in object table 202 ensures that a first user who is working on an intelligence investigation that is classified in Realm 1 will see the object with ID 1 as "J", whereas a second user who is working in Realm 4 will see the same object as "John."

Thus, each row in the object table 202 has a revision value reflecting a time at which that row was valid and was the current revision. Although the preceding example has focused on object labels, the same mechanisms effectively implement controls on all aspects of object data. Thus, because a database object may comprise any form of stored data such as strings, numbers, links, blobs, and other information, the same controls described herein will enable a first analyst in one realm to see one view of even a complex object whereas a second analyst in another realm sees a different view of the object. Event table 204 tracks all events associated with all objects.

The investigation table 206 comprises information about active intelligence investigations; in an embodiment, a state BLOB object is used to store metadata about an investigation.

In an embodiment, application logic 112 can generate and display a graphical user interface (GUI) that includes a graph of nodes that represent database objects that in turn represent people, places, events and things involved in an investigation. In later sections relating to FIG. 5 and other drawing figures, an example GUI is described. The "App Event" table 208 stores information that can be used to display a graph of database objects or a graphical snapshot of database events. In an embodiment, the "App Event" table 208 stores a list of database events, a string description of a graph of objects in a GUI display, and a graphical snapshot of a display of an object history. For example, when an object is added to the revisioning database 108 and a corresponding node is displayed in a GUI display as part of a graph of nodes representing objects, the "App Event" table 208 is updated with an event representing the addition of the node, and a string description of the changed graph. In an embodiment, the graph is stored as an XML string or blob, and the graphical snapshot is a graphics file such as a JPEG file.

The revision table 210 correlates object revision numbers to application events that uniquely relate to a particular form of a displayed graph of nodes. For the preceding example values of object table 202 and event table 204, the contents of revision table 210 would specify that the user progressed in order as follows: App event 0, object revision 0; App event 1, revision 1; App event 0, revision 2; App event 2, revision 3. Thus, as the "John/J" object progressed among versions 0, 1, 2, and 3, the displayed graph had the form associated with App event 0, 1, back to 0, and then 2. The revision table 210 enables application logic 112 to essentially store a linear version of a revision tree that represents states of the displayed graph, thereby facilitating UNDO and REDO operations for displayed graphs.

Figure 3:
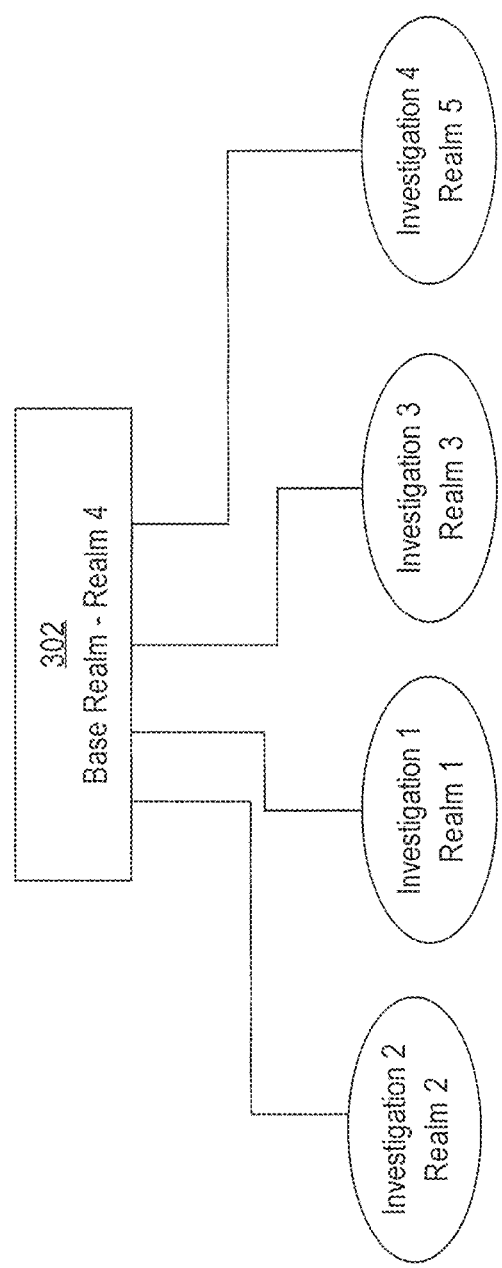
FIG. 3 illustrates organization of realms and investigations.

In an embodiment, application logic 112 associates information in revisioning database 108 with realms that facilitate controlled viewing of objects and controlled publishing of objects of the database to other analysts and users. FIG. 3 illustrates an example organization of realms. In an embodiment, application logic 112 implements a base realm 302, also termed a repository realm or parent realm and one or more other investigative realms or child realms 1, 2, 3, 5, each of which may be associated with one or more projects such as intelligence investigations. The base realm 302 contains data that is shared among all users of the revisioning database 108. Thus, the base realm may represent information that is available to all people who are involved in a team and need to share information.

In an embodiment, an investigative realm or child realm contains data local to a particular project or investigation. While a user can have many investigations, data that is local to another project or investigation of the same user is not more accessible than data local to another user's project or investigation. Thus realms implement controls on data viewing and distribution, rather than user roles or privileges.

For example, the base realm 302 may be denoted Realm 4 and there may be four other realms denoted Realm 1, Realm 2, Realm 3, and Realm 5 each associated with a particular investigation. In an embodiment, application logic 112 implements functions for creating and defining realms, which intelligence investigations are considered within a particular realm, and which objects of revisioning database 108 are considered within a particular realm. As seen in FIG. 2, each object identified in object table 202 has a realm attribute in a column of the object table. Further, application logic 112 implements functions for defining which analysts or users are associated with a particular realm. Information identifying realms, investigations with realms, and analysts within realms may be stored in one or more tables in database 108 or in memory 132.

In this arrangement, an analyst on Investigation 1 in Realm 1 may publish a set of database events from event table 104 to the base realm, Realm 4. The set of events that are published is dictated by a path through the "App Event" tree according to the revision table 210. A different analyst within Realm 3 can subscribe to events associated with Investigation 1. If the analyst in Realm 3 is permitted to receive information from Investigation 1, based on security clearances of the analyst and controls enforced in the publish-subscribe logic module 118, application logic 112 sends copies of selected data rows for Investigation 1 to the analyst in Realm 3. Thus, analysts do not send data directly among themselves. Instead, each analyst publishes data to the base ream 302, and the publish-subscribe module 118 enforces security controls and rules to determine whether a data object can be provided or exported from the database 1008 to a requesting analyst, as further described below for FIG. 4A and FIG. 4B.

In an embodiment, application logic 112 comprises a rules wizard 120 that enables a user or analyst to define one or more restrictions on database objects, properties, or attributes. For example, an analyst can use rules wizard 120 to define rules under which database objects may be exported to other analysts. As a particular example, a rule can specify that a social security number object cannot be exported. As another example, a rule can specify that when a first analyst is a US citizen, an object can be exported to the first analyst in a database view, but when a second analyst is not a US citizen, the same object cannot be exported to the second analyst. Rules can specify decision trees of arbitrary complexity. Rules can apply to objects as a whole or to particular properties of objects.

Rules defined using rules wizard 120 are applied to current versions of objects in revisioning database 108 when a user is generating a Summary View or exporting an investigation, which are described in the next section. In an embodiment, at the time that a user requests an investigation to be exported, the rules wizard 120 examines the current version of each object in the investigation and determines, whether security controls permit actually exporting that object. When objects are created, the objects may be tagged with object properties that specify minimum required security clearance levels to access the objects. During the export operation, the rules wizard compares the security clearance property to the actual security clearance of a person or location to which the export is directed. In one rule implementation, only an analyst holding a security clearance level equal to or greater than the security clearance level of an object can receive an export of that object. If a security control violation is detected, then the object subject to security control is omitted from the export file. An effect of the mechanism defined herein is that an administrator can define a broad policy for security control that is automatically enforced in the system.

Rules defined using rules wizard 120 also can specify how a particular object may be exported from one realm to another realm; that a particular object must be deleted from the database as it is exported; that a particular object may be exported to an export data file format such as XML, PowerPoint, or other data file format; whether a particular analyst can open a particular investigation and receive a display of particular objects; and that a particular object may not be exported from a server that holds the revisioning database to a front-end display application.

Figure 4B:
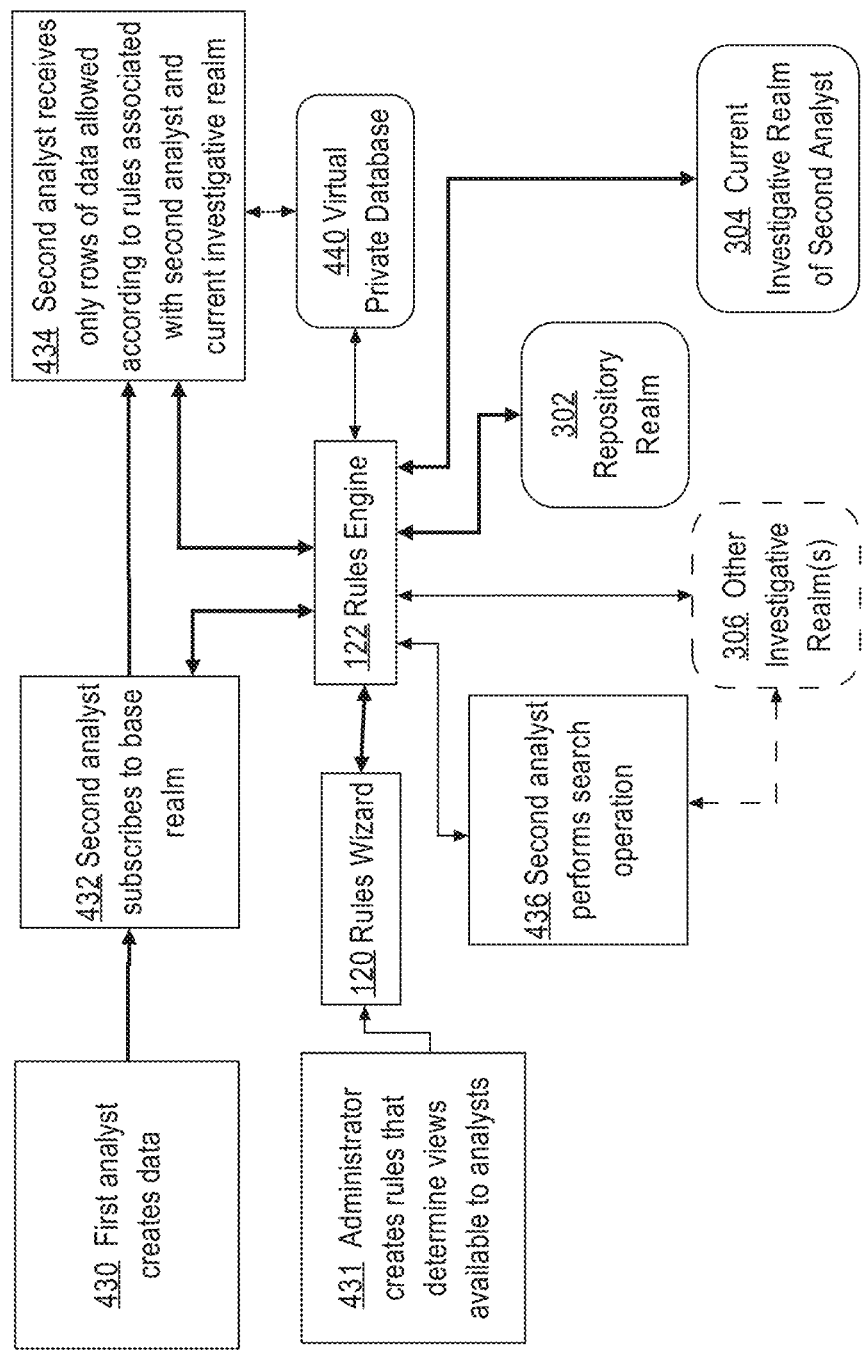
FIG. 4B illustrates operation of a revisioning database system using a publish-subscribe model to provide a virtual private database.

The functional elements, data structures, and techniques described above may be used in many data processing operations applicable to intelligence analysis and other fields. As examples, FIG. 4A illustrates displaying data from a revisioning database based on realms and rules, and FIG. 4B illustrates operation of a revisioning database system using a publish-subscribe model to provide a virtual private database.

Referring first to FIG. 4A, in one embodiment, in step 402 a method comprises creating and storing, in a revisioning database, one or more data objects. In an embodiment, the data objects are subjects of intelligence investigations, events in intelligence investigations, or other data relevant to intelligence investigations. One or more analysts or other users asynchronously dynamically change the data objects or values of properties of the data objects. For example, changes from a first analyst are received at one particular time (step 405A) and changes from a second analyst are received (step 405B) at the same time or any other time. In step 404, the object table and related tables in the revisioning database are updated based on the received changes, using a journaling approach that tracks the history of changes as described above for FIG. 2. Any number of updates may be received and processed. When changes are stored, a realm of the changed object is stored in connection with the object, based on a realm that is then currently associated with the user making the change. As a result, the revisioning database stores data objects, all changes to the data objects, and metadata identifying realms with which the objects are associated at the time of each change.

In step 406, a request is received from a first analyst to view data. The first intelligence analyst is working within a particular investigative realm at the time of the request. Thus, each request to view data includes a realm to which a view of the data is to be delivered. A request may seek access to a different investigative realm for the requesting analyst. A request also may comprise performing an expansion view operation on a presently displayed data object, in which the data object is linked to or associated with other data objects in the current investigative realm or other investigative realms.

In step 408, the method automatically determines, based on the base realm, the first analyst's current realm, rules installed for the current realm, and version information for data objects, which data objects the first analyst can view. Step 408 may comprise retrieving, from the revisioning database 108, information identifying all data objects that are responsive to the user's request and that have realm values matching the current investigative realm, or that are in the base realm. Further, step 408 comprises retrieving or identifying only the current version of each object that is in the base realm of the user's current investigative realm.

Figure 4C:
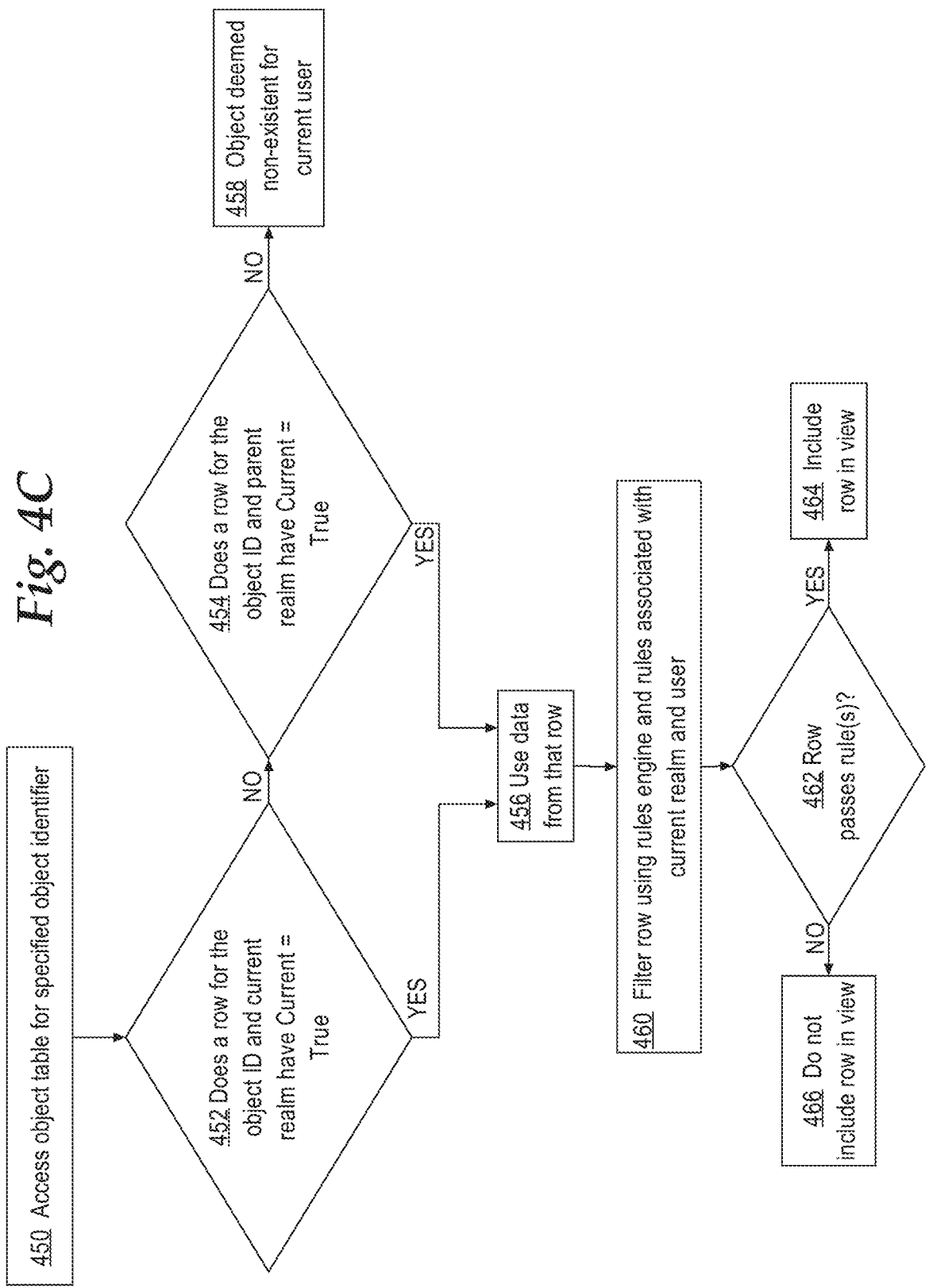
FIG. 4C illustrates determining whether a specified object is part of a view for a particular user and realm.

Step 408 may be implemented using the table structure of FIG. 2 and logic to read table rows, identify realm values that match the base realm and the user's current investigative realm, and identify the most current version of each data object. In an embodiment, the viewable version of an object with a particular object identifier is determined as shown in FIG. 4C and as follows:

a. In step 450, the object table (FIG. 2) is accessed with respect to a specified object identifier for an object of interest.
 b. If there is a row with that object identifier with current flag set to true, as shown in step 452, then data in that row is used at step 456. Otherwise, the row from the parent realm with the current flag set to true is used, as tested at step 454. If there is no such row, the object is considered not to exist, as shown in step 458.
 c. The row identified at step 456 is filtered by the rules engine according to the rules defined, as shown in step 460. This may be done in memory or as part of a SQL query to the DBMS. If the row returned passes the rules, as tested at step 462, it is included in the view as shown in step 464, or omitted from the view as in step 466.

Thus, when a user is operating in a particular investigative realm, the user is permitted to view only data objects that are local to the investigative realm, or in the base realm. In the intelligence context, an example of data local to an investigative realm is a note that the user added to a suspect while viewing the suspect, and an example of data in the base realm might be the results of reviewing a large number of documents that were directly loaded into in the base realm, or that were published to the base realm from another investigative realm.

In general, data local to other investigative realms is not accessible as a matter of policy. However, the revisioning database supports the operation of a global search. For instance, one may wish to see if any analysts had created a person named "John Smith" in an investigative realm but had failed to publish him to the base realm.

In step 410, a particular view of the data is created, and the view includes only such data objects as the first analyst is permitted to view based upon the base realm, the first analyst's current investigative realm, and the installed rules. In step 412, a display of the particular view is provided to the first analyst.

Thus, one effect of the method herein is that a revisioning database containing data objects can provide automatic controlled delivery of the data to data analysts based on a hierarchy of realms applied at the object level, rather than user privileges or roles. The view of each analyst is consistent with that analyst's edits to the data objects, and multiple analysts can concurrently receive different views of the same data objects based on separate sets of changes to the data objects. In other embodiments, the same kinds of controls may be applied to receivers of data other than analysts, such as export files, data realms, and other systems and applications.

With one embodiment, implemented using technology from Palantir Technologies, Inc. of Palo Alto, Calif., each analyst experiences a private view of data in the revisioning database 108 from the standpoint of a current investigative realm of that analyst. Each analyst receives an apparently private view of the data in the revisioning database 108, and values of the same data objects may be different across different investigative realms, depending on the changes made in each realm. Unlike prior approaches, the present approach does not require local copies of data on local machines of the analysts and does not involve displaying textual changes to a single set of shared data objects.

Referring now to FIG. 4B, in step 430, a publish-subscribe operation initiates when a first analyst creates data for potential publication to others or viewing by others. The first analyst may tag data with classification levels or other metadata. An administrator may use rules wizard 120 to specify rules about which data objects are allowed to be viewed by other analysts that are within the base realm to which the data objects have been published, as shown at step 431. Thus, the data objects are associated with a particular base realm, while the rules restrict access for a particular analyst.

In step 432, a second analyst subscribes to the base realm. In step 434, the second analyst receives only published rows of the data for an investigation that the second analyst is allowed to receive. In an embodiment, step 434 is implemented by rules engine 122 identifying a triggering event, such as a change in a data object in the investigative realm for the investigation to which the second analyst subscribed. In response, the rules engine 122 determines if the changed data object is within the repository realm 302 or the current investigative realm of the second analyst. If so, the data object or a view of the data in the data object is published to the second analyst in step 434. The rules applied by rules engine 122 are associated with the second analyst who is viewing the data, and serve to restrict access of the second analyst, rather than the first analyst who is publishing the data. For example, the first analyst might tag data as TOP SECRET and the second analyst may have a rule that specifies that the second analyst cannot view data that is TOP SECRET. Thus, rules operate on the data and the properties of the viewing analyst.

Additionally or alternatively, the second analyst performs a global search operation at step 436. In response to the global search operations, application logic 112 or rules engine 122 retrieves data objects that are within other investigative realms 306.

II. SUMMARY VIEW OF DATA OBJECTS

In an embodiment, application logic 112 implements a summary view function in cooperation with wizard 120. In an embodiment, a Summary View interface enables an analyst to share an investigation, present an investigation to a team leader, or save the investigation for future reference. From the Summary View screen, a user can create a customized report by adding a title and description only for the investigation as a whole and for each individual step. The user can choose both which steps to include or exclude and a format to export the investigation. Exported investigations also automatically adapt to the user's clearance level. Thus, an effect of the approach herein is that a user can share results with anyone without having to worry about security issues.

Using revisioning database 108, application logic 112 saves every action performed by an analyst on database information. In an embodiment, records of such actions can be accessed by a History Window interface (section III herein) and the Summary View interface. The steps of the investigation displayed in the Summary View screen are equivalent to those that are seen in a Temporal view of the History Window as further discussed below. That is, the steps represent all the actions that a user has taken in the investigation, including branches, displayed in the order in which they were performed. Steps are displayed as slides within a graphical user interface. Slides not desired for export can be withheld from the report. Application logic 112 also automatically includes titles and brief descriptions of the action represented by each slide, saving users from the tedious task of entering such information manually. However, a user can edit the provided text. In an embodiment, the final, exported product is a professional presentation in any of several file formats.

Figure 5:
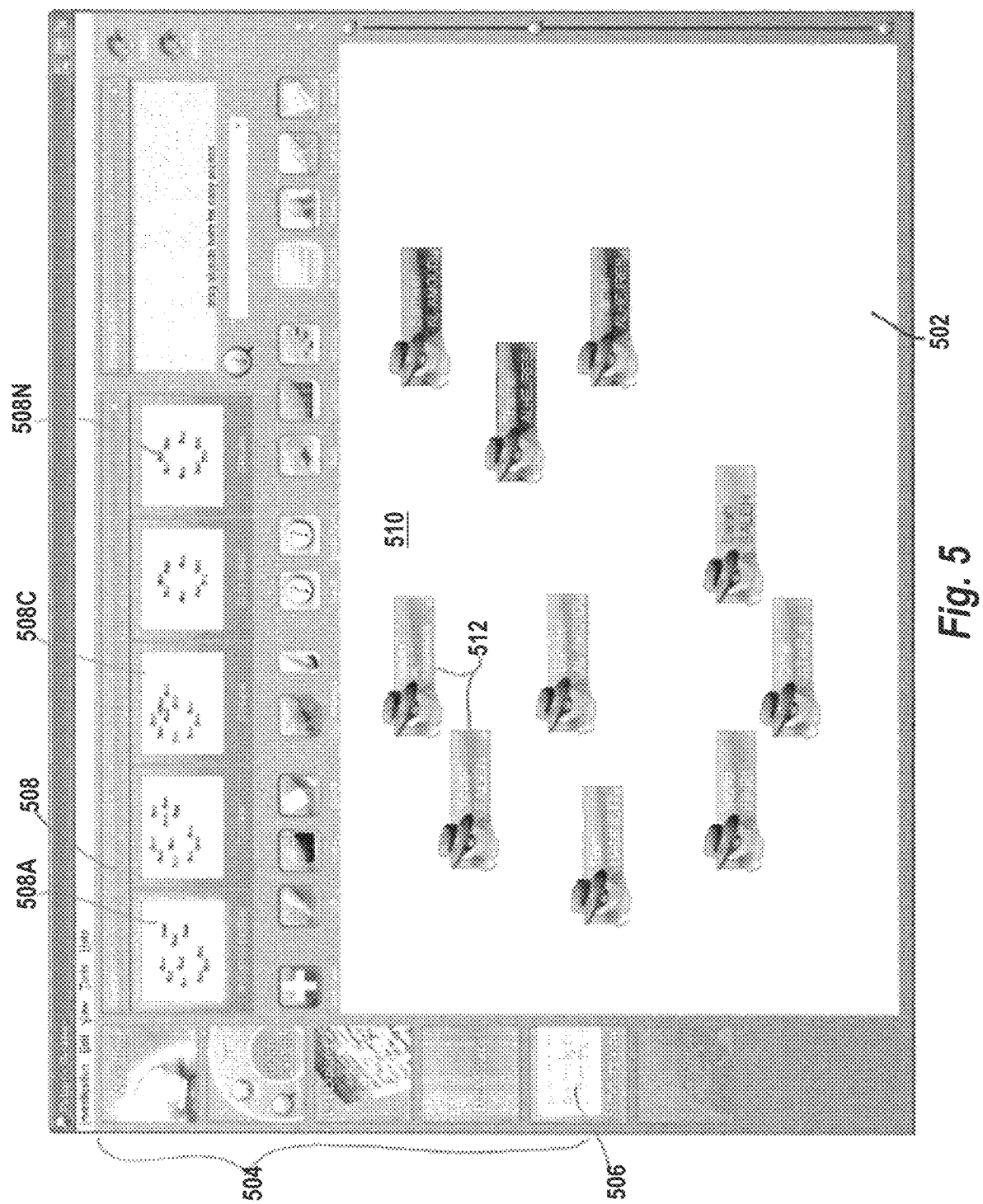
FIG. 5 illustrates an example top-level graphical user interface display that includes historical displays of changes to a revisioning database.

For purposes of illustrating an example, assume that a user has successfully completed an investigation and has been asked to present the user's findings to the rest of a team. In an embodiment, application logic 112 exposes functions of export module 114, publish-subscribe module 118, and other functions described herein in a graphical user interface that is generated and provided to user terminal 106 and to host computers of intelligence analysts 102, 104. FIG. 5 illustrates an example top-level graphical user interface display. Screen display 502 comprises a plurality of icons 504 configured to select functions of application logic 112, including a Summary View icon 506 configured to select the Summary View described further herein. A workspace 510 displays one or more object icons 512 that identify persons, places, things, or events that are the subject of an intelligence investigation and that represent data stored in revisioning database 108. In an embodiment, object icons 512 are displayed in a spatially separated topology to facilitate creating links and associations between persons, places, things, and events involved in an investigation. A history display 508 comprises an ordered plurality of slides 508A, 508C, 508N, etc., that represent thumbnail views of past arrangements of the workspace 510. Thus, viewing the history display 508 indicates how the appearance of workspace 510 has changed over time and enables a user to return to a previous state of workspace 510 by selecting a slide from within the history display 508.

Figure 6:
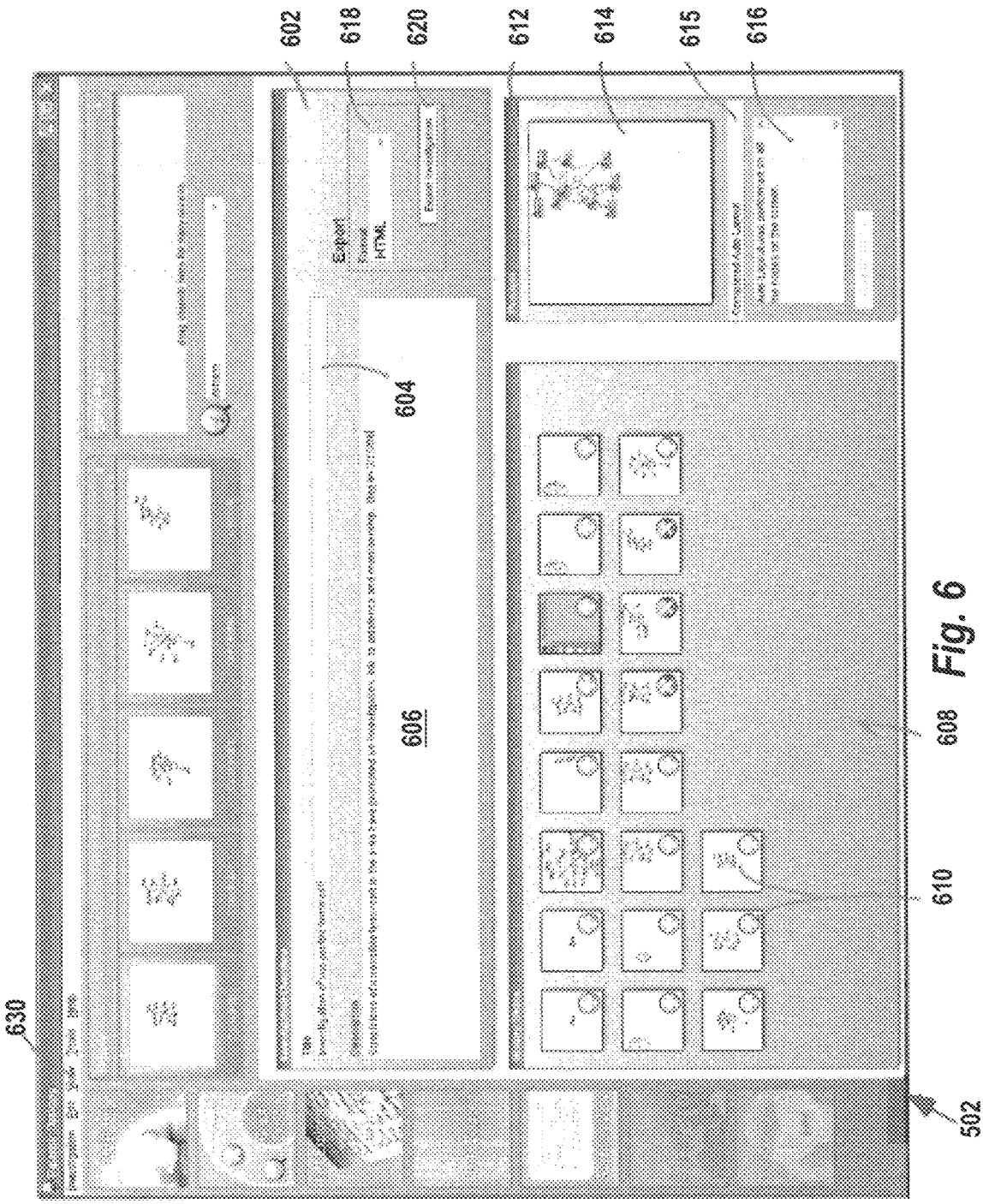
FIG. 6 illustrates an example Summary View display.

When the Summary View icon 506 is selected, in response, application logic generates and provides to user terminal 106 an updated GUI display that includes a summary view. FIG. 6 illustrates an example Summary View display. An investigation overview pane 802 comprises a title input field 604 and a description input field 606. A history slides panel 608 displays thumbnail images 610 of history slides that are candidates to appear in an exported report of an investigation. The history slides panel 608 comprises a summary of steps that occurred in an investigation. Each of the thumbnail images 610 is marked with a include symbol or exclude symbol indicating whether the associated history slide will appear in the report. In an embodiment, the include symbol is "+" and the exclude symbol is "X". In general, using the Summary View of FIG. 6, a user enters a title and description for the investigation, chooses the most relevant steps for the report with history slides panel 608, and selects a preferred export format using export pane 618. Selecting an export button 620 causes application logic to generate a presentation or report in the specified format.

Figure 7:
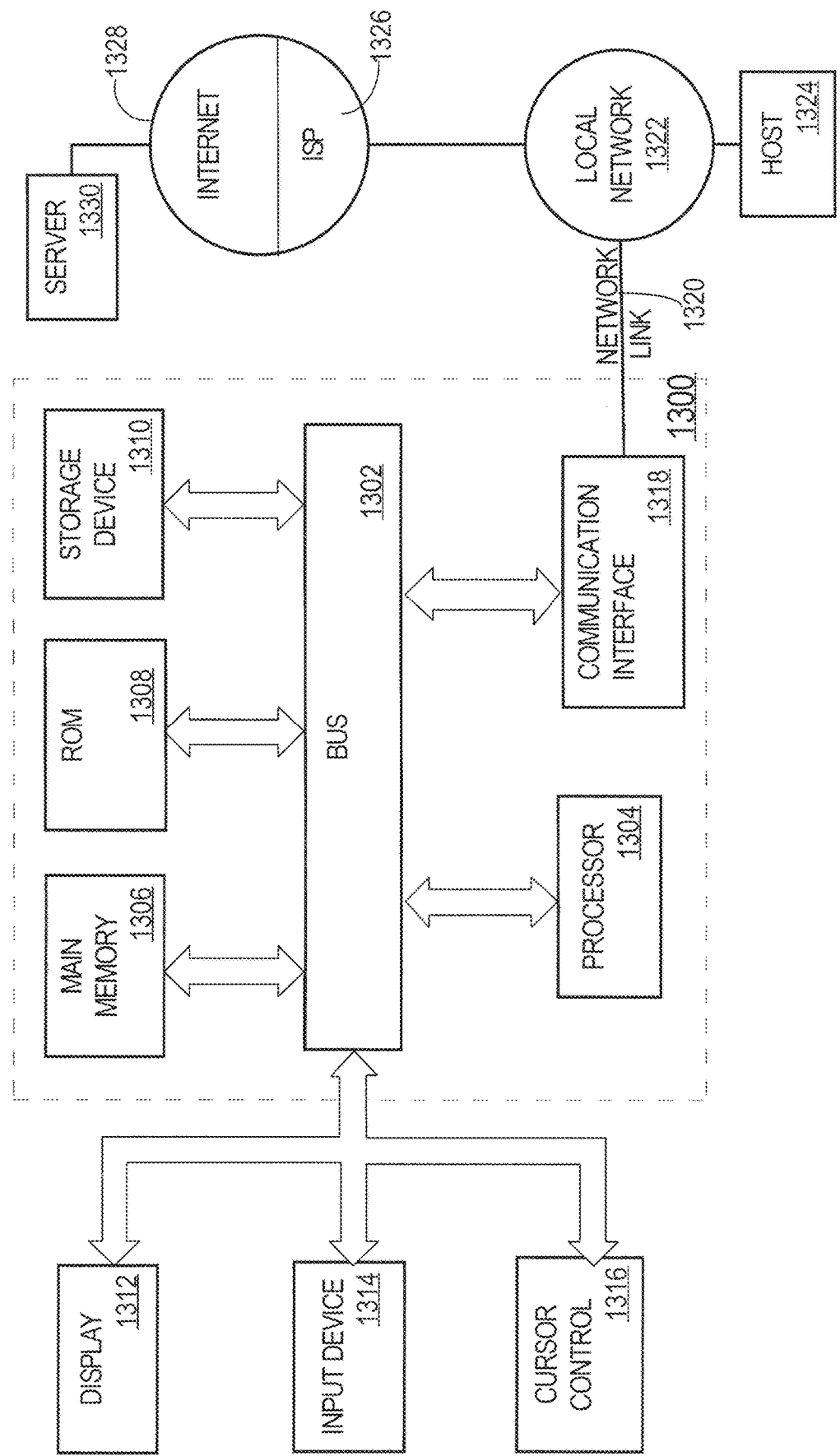
FIG. 7 illustrates a computer system with which an embodiment may be implemented.

Upon displaying the history slides panel 608, a user may select a particular step in an investigation. In response, in a Preview panel 612, the application logic 112 displays a snapshot 614 of the selected step, a title 615, and a description 616 of the selected step. FIG. 7 is an enlarged view of the Preview panel. Both the description 616 and the title 615 can be editing by selecting the appropriate box, making the desired changes, and selecting a "Save Changes" button 702. In an embodiment, a user can select a specific step or thumbnail 610 in the History Slides panel and can change the include symbol or exclude symbol to signal whether to include the associated slide in your report.

The user may enter a title in title input field 604 and a description in description input field 606. In an embodiment, a user may select an export format from export panel 618 using a pull-down menu or other graphical user interface widget, and may complete an export operation by selecting an "Export Investigation" button 620. In response, application logic 112 automatically opens the exported investigation in the selected format for viewing and sharing.

III. EXAMPLE IMPLEMENTATION HARDWARE

FIG. 7 is a block diagram that illustrates a computer system 1300 upon which an embodiment of the invention may be implemented. Computer system 1300 includes a bus 1302 or other communication mechanism for communicating information, and a processor 1304 coupled with bus 1302 for processing information. Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

The invention is related to the use of computer system 1300 for implementing the techniques described herein.

According to one embodiment of the invention, those techniques are performed by computer system 1300 in response to processor 1304 executing one or more sequences of one or more instructions contained in main memory 1306. Such instructions may be read into main memory 1306 from another machine-readable medium, such as storage device 1310. Execution of the sequences of instructions contained in main memory 1306 causes processor 1304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1300, various machine-readable media are involved, for example, in providing instructions to processor 1304 for execution. Such a medium may take many forms, including but not limited to, non-volatile media, volatile media, and transmission media. Non-volatile media includes, for example, optical or magnetic disks, such as storage device 1310. Volatile media includes dynamic memory, such as main memory 1306. Transmission media includes coaxial cables, copper wire and fiber optics, including the wires that comprise bus 1302. Transmission media can also take the form of acoustic or light waves, such as those generated during radio wave and infrared data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1304 for execution. For example, the instructions may initially be carried on a magnetic disk of a remote computer. The remote computer can load the instructions into its dynamic memory and send the instructions over a telephone line using a modem. A modem local to computer system 1300 can receive the data on the telephone line and use an infrared transmitter to convert the data to an infrared signal. An infrared detector can receive the data carried in the infrared signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the worldwide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are exemplary forms of carrier waves transporting the information.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution. In this manner, computer system 1300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
   storing by one or more servers a first child set of data, wherein the first child set of data comprises a first plurality of data object versions that are only accessible at the one or more servers to particular computer users;
   storing by the one or more servers a base set of data, wherein the base set of data comprises a second plurality of data object versions that are only accessible at the one or more servers to the particular computer users;
   asynchronously receiving, from different computer users, a set of respective changes to a particular data object, and in response thereto, creating a version in an object table for each of the sets of respective changes;
   receiving by the one or more servers, from a first computer user of a plurality of computer users, a server command to send the version of the first user to the base set of data;

in response to receiving the server command, sending a particular version of the particular data object from the first child set of data to the base set of data;

in response to receiving the server command, preventing one or more other versions of the particular data object from the first child set of data from being sent to the base set of data by configuring the one or more servers to deny requests to send one or more other versions of the particular data object from the first child set of data;

receiving by the one or more servers, from a second computer user that is currently accessing a second child set of data, a request to access any version of the particular data object that has been sent to the base set of data;

in response to the request, and based at least in part on the sending of the particular version of the particular data object to the base set of data, permitting the second user to access the particular version of the particular data object that has been sent to the base set of data by configuring the one or more servers to permit access to the second user to the particular version of the particular data object that has been sent to the base set of data;

wherein the method is performed through application logic by one or more computing devices.

2. A method as recited in claim 1, further comprising:
receiving by, the one or more servers, definitions of one or more rules and configuring the one or more servers to process the one or more rules, wherein each rule restricts access for one or more computer users to one or more data objects regardless of which set of data contains the one or more data objects; and
wherein permitting the second computer user to access the particular version of the particular data object is based on determining that the one or more rules do not restrict access for the second user to the particular data object as well as being based on the base set of data and a version identifier value for the one or more data objects.

3. A method as recited in claim 1, further comprising:
detecting that a change has occurred in the particular data object; and
wherein permitting the second computer user to access the particular version of the particular data object is based on determining whether the particular data object can be provided to the second computer user based on the base set of data and a version identifier value for the particular data object.

4. A method as recited in claim 1, wherein permitting the second computer user to access the particular version of the particular data object comprises providing only a selected subset of rows of data to the second computer user.

5. A method as recited in claim 1, further comprising:
creating and storing by the one or more servers an object table comprising rows that represent the first plurality of data object versions and the second plurality of data object versions and columns that represent, for each of the first plurality of data object versions and the second plurality of data object versions, an associated set of data, a version value, and a pointer to a previous version, wherein said associated set of data is different from said version value.

6. A method as recited in claim 1, wherein the first plurality of data object versions are only accessible at the one or more servers to particular computer users currently accessing the first child set of data and wherein the second plurality of data object versions are only accessible at the one or more servers to the particular computer users and other computer users that are not currently accessing the first child set of data at the one or more servers.

7. A method as recited in claim 1, wherein sending the particular version of the particular data object to the base set of data comprises sending the particular version of the particular data object to the base set of data without sending data directly between the first computer user and the second computer user.

8. A method as recited in claim 1, further comprising:
creating and storing one or more data object versions; and
wherein each data object version of the one or more data object versions is associated to a version identifier value and to an identifier value for a set of data.

9. One or more non-transitory computer-readable storage media comprising instructions, which when executed by one or more processors, cause the one or more processors to perform:
storing by one or more servers a base set of data, wherein the base set of data comprises a first plurality of data object versions that are accessible to one or more computer users of a project set of data and other computer users different from the one or more computer users;
storing by the one or more servers the project set of data, wherein the project set of data comprises a second plurality of data object versions that are only accessible through the one or more servers to the one or more computer users of the project set of data;
receiving by the one or more servers a first rule definition, wherein the first rule definition restricts access for one or more particular computer users of the one or more computer users of the project set of data to one or more data objects in the project set of data by configuring the one or more servers to restrict access for the one or more particular computer users to the project set of data to the one or more data objects in the project set of data;
receiving, by the one or more servers, from a first computer user of the one or more computer users of the project set of data, a request to access any version of a particular data object;
based on the base set of data, the project set of data, and the first rule definition, identifying one or more particular versions of the particular data object that the first user may access by configuring the server to identify the one or more particular versions in response to the receiving the request to access any version of a particular data object;
generating a view of data on a computer display that includes the one or more particular versions of the particular data object;
displaying the view of data on the computer display to the first computer user.

10. The one or more non-transitory computer-readable storage media of claim 9, wherein identifying one or more particular versions of the particular data object that the first computer user may view comprises:
identifying all data object versions for the particular data object that are associated with the base set of data or the project set of data.

11. The one or more non-transitory computer-readable storage media of claim 9, wherein identifying one or more particular versions of the particular data object that the first computer user may view further comprises:
identifying the most recently modified version of all data object versions for the particular data object that are associated with the base set of data or the project set of data.

12. The one or more non-transitory computer-readable storage media of claim 9, wherein each data object version of at least one of the first and second plurality of data object versions is associated to a version identifier value and to an identifier value for a set of data.

13. One or more non-transitory computer-readable storage media comprising instructions, which when executed by one or more processors, cause the one or more processors to perform:
  storing by one or more servers a first child set of data, wherein the first child set of data comprises a first plurality of data object versions that are only accessible at the one or more servers to particular computer users that are currently accessing the first child set of data;
  storing by the one or more servers a base set of data, wherein the base set of data comprises a second plurality of data object versions that are only accessible at the one or more servers to the particular computer users;
  asynchronously receiving, from different computer users, a set of respective changes to a particular data object, and in response thereto, creating a version in an object table for each of the sets of respective changes;
  receiving by the one or more servers, from a first computer user of a plurality of computer users, a server command to send the version of the first user to the base set of data;
  in response to receiving the server command, sending a particular version of the particular data object from the first child set of data to the base set of data;
  in response to receiving the server command, preventing one or more other versions of the particular data object from the first child set of data from being sent to the base set of data by configuring the one or more servers to deny requests to send one or more other versions of the particular data object from the first child set of data;
  receiving by the one or more servers, from a second computer user that is currently accessing a second child set of data, a request to access any version of the particular data object that has been sent to the base set of data;
  in response to the request, and based at least in part on the sending of the particular version of the particular data object to the base set of data, permitting the second user to access the particular version of the particular data object that has been sent to the base set of data by configuring the one or more servers to permit access to the second user to the particular version of the particular data object that has been sent to the base set of data.

14. The one or more non-transitory computer-readable storage media of claim 13, further comprising instructions, which when executed by the one or more processors, cause the one or more processors to perform:
  receiving definitions of one or more rules by one or more servers, wherein each rule restricts access for one or more computer users to one or more data objects regardless of which set of data contains the one or more data objects; and
  wherein permitting the second computer user to access the particular version of the particular data object is based on determining by the one or more servers that the one or more rules do not restrict access for the second computer user to the particular data object as well as being based on the base set of data and a version identifier value for the one or more data objects.

15. The one or more non-transitory computer-readable storage media of claim 13, further comprising instructions, which when executed by the one or more processors, cause the one or more processors to perform:
  detecting at one or more servers that a change has occurred in the particular data object; and
  wherein permitting the second computer user to access the particular version of the particular data object is based on determining whether the particular data object can be provided to the second computer user based on the base set of data and a version identifier value for the particular data object.

16. The one or more non-transitory computer-readable storage media of claim 13, wherein permitting the second computer user to access the particular version of the particular data object comprises providing only a selected subset of rows of data to the second computer user.

17. The one or more non-transitory computer-readable storage media of claim 13, further comprising instructions, which when executed by the one or more processors, cause the one or more processors to perform:
  creating and storing by one or more servers an object table comprising rows that represent the first plurality of data object versions and the second plurality of data object versions and columns that represent, for each of the first plurality of data object versions and the second plurality of data object versions, an associated set of data, a version value, and a pointer to a previous version, wherein said associated set of data is different from said version value.

18. The one or more non-transitory computer-readable storage media of claim 17, wherein the first plurality of data object versions are only accessible at the one or more servers to particular computer users currently accessing the first child set of data and wherein the second plurality of data object versions are only accessible at the one or more servers to the particular computer users and other computer users that are not currently accessing the first child set of data at the one or more servers.

19. The one or more non-transitory computer-readable storage media of claim 13, wherein sending the particular version of the particular data object to the base set of data comprises sending the particular version of the particular data object to the base set of data without sending data directly between the first computer user and the second computer user.

20. The one or more non-transitory computer-readable storage media of claim 13, further comprising instructions, which when executed by the one or more processors, cause the one or more processors to perform:
  creating and storing, by the one or more servers, one or more data object versions; and
  wherein each data object version of the one or more data object versions is associated to a version identifier value and to an identifier value for a set of data.

* * * * *